(12) United States Patent
Asthana et al.

(10) Patent No.: US 10,972,366 B2
(45) Date of Patent: *Apr. 6, 2021

(54) ORCHESTRATION ENGINE BLUEPRINT ASPECTS FOR HYBRID CLOUD COMPOSITION

(71) Applicant: International Business Machines Corporation, Armonk, NY (US)

(72) Inventors: Neeraj Asthana, Acton, MA (US); Thomas E. Chefalas, Somers, NY (US); Alexei Karve, Mohegan Lake, NY (US); Clifford A. Pickover, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 215 days.

This patent is subject to a terminal disclaimer.

(21) Appl. No.: 15/841,412

(22) Filed: Dec. 14, 2017

(65) Prior Publication Data

US 2019/0190797 A1 Jun. 20, 2019

(51) Int. Cl.
*H04L 12/24* (2006.01)
*G06F 9/50* (2006.01)
(Continued)

(52) U.S. Cl.
CPC ........ *H04L 41/5048* (2013.01); *G06F 9/5077* (2013.01); *H04L 41/082* (2013.01);
(Continued)

(58) Field of Classification Search
CPC ... H04L 67/1097; H04L 41/082; H04L 41/16; H04L 41/5048; H04L 63/1433;
(Continued)

(56) References Cited

U.S. PATENT DOCUMENTS 6,088,665 A 7/2000 Burns et al.
8,448,170 B2 5/2013 Wipfel et al.
(Continued)

FOREIGN PATENT DOCUMENTS

CN 101086779 A 12/2007
CN 105518650 A 4/2016
(Continued)

OTHER PUBLICATIONS

Wu, et al., "Cloud-based design and manufacturing: A new paradigm in digital manufacturing and design innovation," Computer-Aided Design (2014), http://dx.doi.org/10.1016/j.cad.2014.07.006, 38 pages.
(Continued)

*Primary Examiner* — Ario Etienne
*Assistant Examiner* — Kidest Mendaye
(74) *Attorney, Agent, or Firm* — Amin, Turocy & Watson, LLP

(57) ABSTRACT

Techniques that facilitate orchestration engine blueprint aspects for hybrid cloud composition are provided. In one example, a system includes a blueprint component, a hybrid cloud composition component, and a learning component. The blueprint component determines one or more blueprint-level aspects for a blueprint associated with a cloud-based computing platform. The one or more blueprint-level aspects are indicative of encoded information for one or more features associated with one or more computing resources for the cloud-based computing platform. The hybrid cloud composition component determines a set of resource definitions for the cloud-based computing platform based on the one or more blueprint-level aspects. The learning component monitors the cloud-based computing platform based on the one or more blueprint-level aspects to
(Continued)

learn one or more features associated with the cloud-based computing platform.

23 Claims, 13 Drawing Sheets

(51) Int. Cl.
  *H04L 29/08* (2006.01)
  *H04L 29/06* (2006.01)
(52) U.S. Cl.
  CPC ............ *H04L 41/145* (2013.01); *H04L 41/16* (2013.01); *H04L 63/1433* (2013.01); *H04L 67/1097* (2013.01); H04L 41/0859 (2013.01); H04L 67/10 (2013.01)
(58) Field of Classification Search
  CPC ... H04L 41/145; H04L 41/0859; H04L 67/10; G06F 9/445
  See application file for complete search history.

(56) References Cited

U.S. PATENT DOCUMENTS

| | | | |
|---|---|---|---|
| 8,756,091 | B2 | 6/2014 | Simons et al. |
| 9,239,727 | B1 | 1/2016 | Panchapakesan |
| 9,268,592 | B2 | 2/2016 | Hassine et al. |
| 9,378,044 | B1 | 6/2016 | Gaurav et al. |
| 9,426,030 | B1 | 8/2016 | Anerousis et al. |
| 9,569,737 | B2 | 2/2017 | Simons et al. |
| 9,678,731 | B2 | 6/2017 | Hassine et al. |
| 9,702,858 | B1 | 7/2017 | Minvielle |
| 9,754,303 | B1* | 9/2017 | Jagtap ................ G06Q 30/0621 |
| 10,063,427 | B1 | 8/2018 | Brown |
| 10,355,922 | B1* | 7/2019 | Stienhans ........... H04L 41/0806 |
| 10,547,521 | B1 | 1/2020 | Roy et al. |
| 2005/0091289 | A1* | 4/2005 | Shappell ............... H04L 67/104 |
| 2005/0246712 | A1 | 11/2005 | Ferris |
| 2007/0294062 | A1 | 12/2007 | Liu |
| 2008/0085729 | A1 | 4/2008 | Lira et al. |
| 2009/0088883 | A1* | 4/2009 | Baier ...................... G06T 7/001 700/110 |
| 2009/0232020 | A1 | 9/2009 | Baalbergen et al. |
| 2010/0332629 | A1 | 12/2010 | Cotugno et al. |
| 2011/0004672 | A1 | 1/2011 | Garcia-Martin et al. |
| 2011/0321033 | A1 | 12/2011 | Kelkar et al. |
| 2012/0053925 | A1 | 3/2012 | Geffin et al. |
| 2012/0226898 | A1 | 9/2012 | Bantz et al. |
| 2013/0036208 | A1 | 2/2013 | Dochez |
| 2013/0104236 | A1 | 4/2013 | Ray et al. |
| 2013/0232254 | A1* | 9/2013 | Srikanth ............. H04L 43/0817 709/224 |
| 2013/0232480 | A1 | 9/2013 | Winterfeldt et al. |
| 2013/0232498 | A1 | 9/2013 | Mangtani et al. |
| 2013/0305080 | A1 | 11/2013 | Behrendt et al. |
| 2013/0332225 | A1* | 12/2013 | Morinaga .......... G06Q 10/0635 705/7.28 |
| 2014/0075032 | A1 | 3/2014 | Vasudevan et al. |
| 2014/0075427 | A1 | 3/2014 | Pallamreddy et al. |
| 2014/0229426 | A1 | 8/2014 | Gootee et al. |
| 2014/0280142 | A1 | 9/2014 | Wasson et al. |
| 2015/0074279 | A1* | 3/2015 | Maes ..................... G06F 9/5072 709/226 |
| 2015/0161301 | A1 | 6/2015 | Begur et al. |
| 2015/0180949 | A1* | 6/2015 | Maes ...................... H04L 43/10 709/201 |
| 2015/0248277 | A1 | 9/2015 | Sabbouh |
| 2015/0350021 | A1* | 12/2015 | Morris ................ H04L 41/0816 709/224 |
| 2015/0381411 | A1 | 12/2015 | Keagy et al. |
| 2016/0034809 | A1 | 2/2016 | Trenholm et al. |
| 2016/0162312 | A1 | 6/2016 | Doherty et al. |
| 2016/0162478 | A1 | 6/2016 | Blassin et al. |
| 2016/0234073 | A1* | 8/2016 | Maes ...................... H04L 41/12 |
| 2016/0253445 | A1 | 9/2016 | Pataky |
| 2016/0259638 | A1 | 9/2016 | El Maghraoui et al. |
| 2016/0328273 | A1 | 11/2016 | Molka et al. |
| 2016/0364255 | A1 | 12/2016 | Chefalas et al. |
| 2016/0379125 | A1 | 12/2016 | Bordaweker et al. |
| 2017/0054641 | A1* | 2/2017 | Anerousis ............. H04W 24/08 |
| 2017/0061321 | A1 | 3/2017 | Maiya Belur et al. |
| 2017/0062009 | A1 | 3/2017 | Clifton et al. |
| 2017/0076094 | A1 | 3/2017 | Bae |
| 2017/0149630 | A1 | 5/2017 | Feller et al. |
| 2017/0180567 | A1 | 6/2017 | Sharma et al. |
| 2017/0220963 | A1 | 8/2017 | Canaran et al. |
| 2017/0289060 | A1 | 10/2017 | Aftab et al. |
| 2017/0302537 | A1* | 10/2017 | Maes .................. H04L 41/0893 |
| 2018/0097744 | A1* | 4/2018 | Hu ....................... H04L 67/1002 |
| 2018/0307945 | A1 | 10/2018 | Haigh et al. |
| 2018/0315055 | A1* | 11/2018 | Pickover ............... H04L 9/3297 |
| 2018/0316676 | A1 | 11/2018 | Gilpin et al. |
| 2018/0322556 | A1* | 11/2018 | Padmanabh ............ G06F 9/547 |
| 2018/0336362 | A1* | 11/2018 | Guttmann ............. H04L 63/102 |
| 2018/0357152 | A1 | 12/2018 | Browne et al. |
| 2019/0065277 | A1* | 2/2019 | Raikov ................. G06F 9/5077 |
| 2019/0122156 | A1 | 4/2019 | Asthana et al. |
| 2019/0164080 | A1 | 5/2019 | Stefani et al. |

FOREIGN PATENT DOCUMENTS

| | | | | |
|---|---|---|---|---|
| EP | 1194862 A1 * | 4/2002 | ............... | G06N 5/02 |
| WO | WO-2007147166 A2 * | 12/2007 | ............... | G06N 5/02 |
| WO | 2014/088537 A1 | 6/2014 | | |
| WO | 2017/074469 A1 | 5/2017 | | |
| WO | WO-2018008605 A1 * | 1/2018 | ............. | G06F 3/048 |

OTHER PUBLICATIONS pubs.vmware.com, "Creating a Cloud Blueprint," Retrieved Sep. 26, 2017, 1 page.
docs.oracle.com, "Introduction to Blueprints," Enterprise Manager Cloud Administration Guide, Section 57, Retrieved Sep. 26, 2017, 15 pages.
List of IBM Patents or Applications Treated as Related.
Office Action for U.S. Appl. No. 15/841,420 dated Jul. 8, 2019, 21 pages.
International Search Report and Written Opinion for International Application Serial No. PCT/IB2018/059876 dated Apr. 17, 2019, 10 pages.
International Search Report and Written Opinion for International Application Serial No. PCT/IB2018/059877 dated Apr. 24, 2019, 9 pages.
Asthana, "A declarative approach for service enablement on hybrid cloud orchestration engines," NOMS 2018 2018, IEEE/IFIP Network Operations and Management Symposium Jul. 9, 2018 (Jul. 9, 2018) ISSN:2374-9709 part I to part VII, 7 pages.
International Search Report for PCT Application No. PCT/IB2018/058815 dated Mar. 20, 2019, 9 pgs.
Non-Final Office Action for U.S. Appl. No. 15/841,403 dated Apr. 25, 2019.
International Search Report and Written Opinion received for PCT Application Serial No. PCT/IB2018/059875 dated Apr. 15, 2019, 8 pages.
Non-Final Office Action received for U.S. Appl. No. 15/841,403 dated Jan. 17, 2020, 27 pages.
Final Office Action received for U.S. Appl. No. 15/841,420 dated Dec. 17, 2019, 28 pages.
Final Office Action received for U.S. Appl. No. 15/841,403 dated Aug. 29, 2019, 38 pages.
Final Office Action received for U.S. Appl. No. 15/841,403 dated May 27, 2020, 40 pages.
Notice of Allowance received for U.S. Appl. No. 15/841,420 dated Jul. 27, 2020, 39 pages.
Non-Final Office Action received for U.S. Appl. No. 15/841,403 dated Oct. 27, 2020, 48 pages.
The extended European search report received for EP Patent Application Serial No. 18887731.0 dated Dec. 21, 2020, 9 pages.

(56) References Cited

OTHER PUBLICATIONS

The extended European search report received for EP Patent Application Serial No. 18887901.9 dated Dec. 23, 2020, 10 pages.

* cited by examiner

@(persistence = true, zone = dallas)
resource "softlayer:virtual_machine"
{
  name = "my_server_1"
  domain = "example.com"
  ssh_keys = [ "123456" ]
  image = "DEBIAN_7_64"
  region = "dallas"
  public_network_speed = 10
  cpu = 2
  ram = 4096
} resource "database:IBMDB2"
{
  name = "my_database_1"
  db_instance = "inventory"
  target = ${"my_server_1"}
}

804

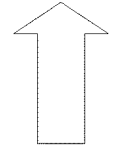

702

{
  @(service_level = 99.9, security = high)
  resource
  "softlayer:virtual_machine"
  name = "my_server_1"
  domain = "example.com"
  ssh_keys = [ "123456" ]
}

# ORCHESTRATION ENGINE BLUEPRINT ASPECTS FOR HYBRID CLOUD COMPOSITION

BACKGROUND

The subject disclosure relates to cloud computing systems, and more specifically, to computing resources for cloud computing systems.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that facilitate orchestration engine blueprint aspects for hybrid cloud composition are described.

According to an embodiment, a system can comprise a blueprint component, a hybrid cloud composition component, and a learning component. The blueprint component can determine one or more blueprint-level aspects for a blueprint associated with a cloud-based computing platform. The one or more blueprint-level aspects can be indicative of encoded information for one or more features associated with one or more computing resources for the cloud-based computing platform. The hybrid cloud composition component can determine a set of resource definitions for the cloud-based computing platform based on the one or more blueprint-level aspects. The learning component can monitor the cloud-based computing platform based on the one or more blueprint-level aspects to learn one or more features associated with the cloud-based computing platform.

According to another embodiment, a computer-implemented method is provided. The computer-implemented method can comprise identifying, by a system operatively coupled to a processor, one or more blueprint-level aspects from a blueprint associated with information for one or more computing resources of a cloud-based computing platform. The computer-implemented method can also comprise generating, by the system, a set of resource definitions for the cloud-based computing platform based on the one or more blueprint-level aspects. Furthermore, the computer-implemented method can comprise modifying, by the system, the blueprint based on the set of resource definitions. The computer-implemented method can also comprise monitoring, by the system, the cloud-based computing platform based on the one or more blueprint-level aspects to learn one or more features associated with the cloud-based computing platform.

According to yet another embodiment, a computer program product for facilitating an orchestration engine process can comprise a computer readable storage medium having program instructions embodied therewith. The program instructions can be executable by a processor and cause the processor to extract, by the processor, one or more blueprint-level aspects from a blueprint formatted with information for one or more computing resources of a cloud-based computing platform. The program instructions can also cause the processor to determine, by the processor, a set of resource definitions for the cloud-based computing platform based on the one or more blueprint-level aspects. Furthermore, the program instructions can cause the processor to generate, by the processor, a modified blueprint for the cloud-based computing based on the set of resource definitions. The program instructions can also cause the processor to monitor, by the processor, the cloud-based computing platform based on the modified blueprint to learn one or more features associated with the cloud-based computing platform.

According to yet another embodiment, a system can comprise a computing resource component, a blueprint component, a hybrid cloud composition component, and a learning component. The computing resource component can modify one or more first computing resources for a cloud-based computing platform to generate one or more second computing resources for the cloud-based computing platform. The blueprint component can determine one or more blueprint-level aspects for a blueprint associated with the cloud-based computing platform. The one or more blueprint-level aspects can be indicative of encoded information for one or more features associated with the one or more second computing resources for the cloud-based computing platform. The hybrid cloud composition component can determine a set of resource definitions for the cloud-based computing platform based on the one or more blueprint-level aspects. The learning component can monitor the cloud-based computing platform based on the one or more blueprint-level aspects to learn one or more features associated with the cloud-based computing platform.

According to yet another embodiment, a computer-implemented method is provided. The computer-implemented method can comprise generating, by a system operatively coupled to a processor, one or more computing resources for a cloud-based computing platform by modifying a previous version of the one or more computing resources. The computer-implemented method can also comprise identifying, by the system, one or more blueprint-level aspects from a blueprint associated with information for the one or more computing resources. Furthermore, the computer-implemented method can comprise generating, by the system, a set of resource definitions for the cloud-based computing platform based on the one or more blueprint-level aspects. The computer-implemented method can also comprise modifying, by the system, the blueprint based on the set of resource definitions. Furthermore, the computer-implemented method can comprise monitoring, by the system, the cloud-based computing platform based on the one or more blueprint-level aspects to learn one or more features associated with the cloud-based computing platform.

DESCRIPTION OF THE DRAWINGS

FIG. 8 illustrates another example, non-limiting system that includes a blueprint and a modified blueprint in accordance with one or more embodiments described herein.

DETAILED DESCRIPTION

Figure 1:
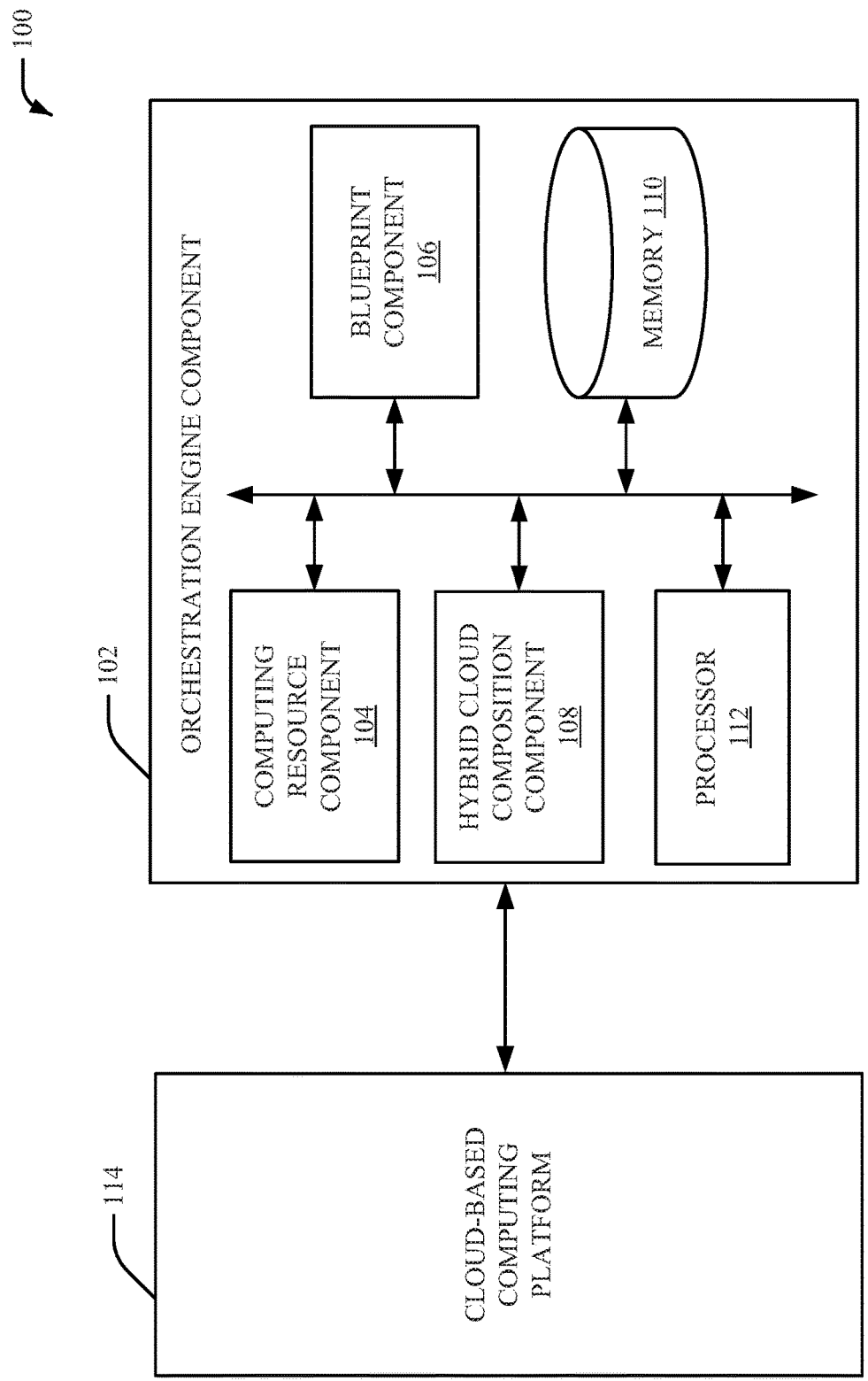
FIG. 1 illustrates a block diagram of an example, non-limiting system that includes an orchestration engine component in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.
Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.
Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).
Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

An orchestration engine can manage computing resources and/or workflows in a cloud computing environment. For instance, an orchestration engine can create, modify, configure and/or delete computing resources such as, for example, infrastructure computing resources, virtual machine computing resources, hardware computing resources, software application computing resources, etc. However, with an orchestration engine employed today, it is generally difficult to translate requirements for a cloud computing environment into hardware properties and/or software properties for the cloud computing environment. For example, with an orchestration engine employed today, it is generally difficult to determine operating system requirements, memory requirements, processing requirements and/or other requirements for a cloud computing environment. Therefore, an improved orchestration engine is needed.

Embodiments described herein include systems, computer-implemented methods, and computer program products that facilitate orchestration engine blueprint aspects for hybrid cloud composition. For example, one or more blueprint-level aspects can be incorporated within an orchestration engine blueprint. As used herein, a "blueprint" and an "orchestration engine blueprint" are defined as a template or a pattern that declares one or more computing resources for a cloud computing environment (e.g., a cloud-based computing platform). A blueprint for an orchestration engine can also be a declarative representation of a workload that is formatted in a machine-readable format and a human-readable format. Furthermore, a blueprint for an orchestration engine describes a type of computing resource and/or properties for a computing resource that will be created for a cloud computing environment. Moreover, as used herein, an "aspect" and a "blueprint-level aspect" are defined as a specification for a feature or a quality of a computing resource included in a blueprint. A blueprint-level aspect can be, for example, an environment aspect, a monitoring aspect, a notification aspect, an alert aspect, an auto-scaling aspect, a load-balancing aspect, a security aspect, another type of aspect, etc. In an embodiment, a system can include a cloud-based computing platform and an orchestration engine. The orchestration engine can employ a blueprint to declare one or more computing resources. For instance, the orchestration engine can modify and/or compose one or more computing resources. The one or more computing resources can be computing resources for a virtual machine, storage, middleware, other hardware and/or other software. Furthermore, one or more blueprints can specify (e.g., declare) computing resources and/or a composition of solutions to achieve a goal associated with the cloud-based computing platform. One or more blueprint-level aspects can also be determined. Based on the blueprints and the blueprint-level aspects, resource definitions and/or resource properties can be determined. In an aspect, the resource definitions and/or resource properties can also be populated into the blueprints. Accordingly, one or more computing resource requirements for a cloud-based environment (e.g., a cloud-based computing platform) can be translated into hardware properties and/or software properties for the cloud-based environment (e.g., the cloud-based computing platform). For instance, operating system requirements, memory requirements, processing requirements and/or other requirements for a cloud-based environment (e.g., a cloud-based computing platform) can be efficiently determined. Moreover, efficiency and/or performance of a cloud-based environment (e.g., a cloud-based computing platform) can be improved. For instance, efficiency and/or performance of hardware and/or software included in a cloud-based environment (e.g., a cloud-based computing platform) can be improved.

FIG. 1 illustrates a block diagram of an example, non-limiting system 100 that facilitates orchestration engine blueprint aspects for hybrid cloud composition in accordance with one or more embodiments described herein. In various embodiments, the system 100 can be an orchestration engine system associated with technologies such as, but not limited to, cloud computing technologies, computer technologies, server technologies, information technologies, machine learning technologies, artificial intelligence technologies, digital technologies, data analysis technologies, and/or other computer technologies. The system 100 can employ hardware and/or software to solve problems that are highly technical in nature, that are not abstract and that cannot be performed as a set of mental acts by a human. Further, some of the processes performed may be performed by one or more specialized computers (e.g., one or more specialized processing units, a specialized computer with an orchestration engine component, etc.) for carrying out defined tasks related to machine learning. The system 100 and/or components of the system can be employed to solve new problems that arise through advancements in technologies mentioned above, employment of cloud-computing systems, and/or computer architecture, and the like. One or more embodiments of the system 100 can provide technical improvements to cloud computing systems, computer systems, server systems, information technology systems, machine learning systems, artificial intelligence systems, digital systems, data analysis systems, and/or other systems. One or more embodiments of the system 100 can also provide technical improvements to a processing unit (e.g., a processor) associated with an orchestration engine process by improving processing performance of the processing unit, improving processing efficiency of the processing unit, and/or reducing an amount of time for the processing unit to perform a patch management process. One or more embodiments of the system 100 can also provide technical improvements to a cloud computing environment (e.g., a cloud-based computing platform) by improving processing performance of the cloud computing environment and/or improving processing efficiency of the cloud computing environment. In one example, the system 100 can be associated with an orchestration engine process.

In the embodiment shown in FIG. 1, the system 100 can include an orchestration engine component 102. As shown in FIG. 1, the orchestration engine component 102 can include a computing resource component 104, a blueprint component 106, and a hybrid cloud composition component 108. Aspects of the orchestration engine component 102 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described. In an aspect, the orchestration engine component 102 can also include memory 110 that stores computer executable components and instructions. Furthermore, the orchestration engine component 102 can include a processor 112 to facilitate execution of the instructions (e.g., computer executable components and corresponding instructions) by the orchestration engine component 102. As shown, the computing resource component 104, the blueprint component 106, the hybrid cloud composition component 108, the memory 110 and/or the processor 112 can be electrically and/or communicatively coupled to one another in one or more embodiments. In certain embodiments, the orchestration engine component 102 can be in communication with a cloud-based computing platform 114. The cloud-based computing platform 114 can be a cloud computing environment. In one example, the cloud-based computing platform 114 can be a hybrid cloud-based computing platform. In another example, the cloud-based computing platform 114 can be a public cloud-based computing platform. In yet another example, the cloud-based computing platform 114 can be a private cloud-based computing platform.

The computing resource component 104 can determine one or more computing resources for the cloud-based computing platform 114. The one or more computing resources for the cloud-based computing platform 114 can include one or more computing resources for hardware associated with the cloud-based computing platform 114 and/or one or more computing resources for software associated with the cloud-based computing platform 114. In a non-limiting example, the one or more computing resources can include one or more computing resources for a processor associated with the cloud-based computing platform 114, one or more computing resources for a virtual machine associated with the cloud-based computing platform 114, one or more computing resources for storage associated with the cloud-based computing platform 114, one or more computing resources for middleware associated with the cloud-based computing platform 114, and/or one or more other computing resources associated with the cloud-based computing platform 114.

In an embodiment, the computing resource component 104 can receive a blueprint associated with the cloud-based computing platform 114. The blueprint associated with the cloud-based computing platform 114 can be, for example, a template or a pattern that declares one or more computing resources for the cloud-based computing platform 114. The blueprint associated with the cloud-based computing platform 114 can also describe a type of computing resource and/or properties for a computing resource that is created for the cloud-based computing platform 114. In an aspect, the blueprint can be exported from the cloud-based computing platform 114 as a readable text file. The readable text file associated with the blueprint can be formatted in a machine-readable format and a human-readable format. For example, the blueprint can be a machine-readable representation and a human-readable representation of the one or more computing resources. In one example, the readable text file associated with the blueprint can be formatted in a machine-readable format and a human-readable format associated with a data serialization language. In another example, the readable text file associated with the blueprint can be formatted in a machine-readable format and a human-readable format associated with a data array language. In yet another example, the readable text file associated with the blueprint can be formatted in a machine-readable format and a human-readable format associated with automated documentation. As such, the blueprint associated with the cloud-based computing platform 114 can be a declarative representation of one or more computing resources for the cloud-based computing platform 114 that is formatted in a machine-readable format and a human-readable format. In an aspect, the computing resource component 104 can interpret content of the blueprint to determine the one or more computing resources for the cloud-based computing platform 114. For example, the computing resource component 104 can interpret machine-readable content and/or human-readable content to determine the one or more computing resources for the cloud-based computing platform 114. In an embodiment, the computing resource component 104 can determine one or more dependencies between the one or more computing resources for the cloud-based computing platform 114 based on the content of the blueprint. In another embodiment, the computing resource component 104 can modify the one or more computing resources determined for the cloud-based computing platform 114. For example, the computing resource component 104 can generate one or more modified computing resources for the cloud-based computing platform 114 by modifying the one or more computing resources determined from the blueprint associated with the cloud-based computing platform 114. In one example, the computing resource component 104 can modify a previous version of the one or more computing resources to generate the one or more computing resources for the cloud-based computing platform 114.

The blueprint component 106 can determine one or more blueprint-level aspects for the blueprint associated with the cloud-based computing platform 114. The one or more blueprint-level aspects can be indicative of encoded information for one or more features associated with one or more computing resources for the cloud-based computing platform 114. In an embodiment, the blueprint associated with the cloud-based computing platform 114 can include the one or more blueprint-level aspects. Furthermore, the blueprint component 106 can extract the one or more blueprint-level aspects from the blueprint associated with the cloud-based computing platform 114. In one example, the blueprint component 106 can determine the one or more blueprint-level aspects for a resource definition portion within the blueprint. In another example, the blueprint component 106 can determine encoded data within the one or more blueprint-level aspects. The encoded data within the one or more blueprint-level aspects can include, for example, service level agreement data, software data, deployment environment data, cost data, security data, response time data, dependency data, deadline data, description data, benchmark data, maintainer data, and/or other data associated with the cloud-based computing platform 114. In another embodiment, the blueprint component 106 can employ an aspect knowledge database to identify the one or more blueprint-level aspects in the blueprint associated with the cloud-based computing platform 114. The aspect knowledge database can be a collection of previously identified blueprint-level aspects and/or information for previously identified blueprint-level aspects. In one example, the aspect knowledge database can be stored in the memory 110 or another memory. In yet another embodiment, the blueprint component 106 can determine the one or more blueprint-level aspects based on historical data associated with the cloud-based computing platform 114. Additionally or alternatively, the blueprint component 106 can determine the one or more blueprint-level aspects based on historical data associated another cloud-based computing platform that is different than the cloud-based computing platform 114. For example, the historical data can include previously determined performance data associated with the cloud-based computing platform 114 and/or another cloud-based computing platform.

The hybrid cloud composition component 108 can determine a set of resource definitions for the cloud-based computing platform 114 based on the one or more blueprint-level aspects. The set of resource definitions can include one or more definitions to facilitate monitoring, auto-scaling, load balancing, event management and/or persistence associated with the cloud-based computing platform 114. For example, the set of resource definitions can include resource data to facilitate monitoring, auto-scaling, load balancing, event management and/or persistence associated with the cloud-based computing platform 114. In an aspect, the set of resource definitions can include one or more definitions for hardware associated with the cloud-based computing platform 114, software associated with the cloud-based computing platform 114, a virtual machine associated with the cloud-based computing platform 114, storage associated with the cloud-based computing platform 114, middleware associated with the cloud-based computing platform 114, and/or another resource associated with the cloud-based computing platform 114. In one example, the set of resource definitions can include a number of processors and/or a type of processor for the cloud-based computing platform 114. Additionally or alternatively, the set of resource definitions can include an amount of memory and/or a type of memory for the cloud-based computing platform 114. Additionally or alternatively, the set of resource definitions can include a network speed for the cloud-based computing platform 114. However, it is to be appreciated that the set of resource definitions can include a definition for other resources associated with the cloud-based computing platform 114. In an embodiment, the hybrid cloud composition component 108 can dynamically determine resource data associated with the set of resource definitions based on the one or more blueprint-level aspects. For instance, the hybrid cloud composition component 108 can dynamically populate the set of resource definitions with resource data based on the one or more blueprint-level aspects. In certain embodiments, the blueprint component 106 can modify the blueprint associated with the cloud-based computing platform 114 to generate a modified blueprint. The modified blueprint can include the set of resource definitions determined by the hybrid cloud composition component 108. Furthermore, in certain embodiments, the blueprint component 106 can transmit the modified blueprint to the cloud-based computing platform 114 to facilitate employment of the modified blueprint by the cloud-based computing platform 114. In one embodiment, the modified blueprint and/or the one or more blueprint-level aspects can be employed to determine an optimal path of execution for hardware and/or software associated with the cloud-based computing platform 114.

In certain embodiments, the blueprint component 106 and/or the hybrid cloud composition component 108 can facilitate display of the modified blueprint and/or the set of resource definitions. For instance, the blueprint component 106 and/or the hybrid cloud composition component 108 can render the modified blueprint and/or the set of resource definitions on a display device. The display device can be, for example, a computing device with a display, a computer, a desktop computer, a laptop computer, a monitor device, a smart device, a smart phone, a mobile device, a handheld device, a tablet, a wearable device, a portable computing device or another type of device associated with a display. In an aspect, the blueprint component 106 and/or the hybrid cloud composition component 108 can generate a user interface to display at least a portion of the modified blueprint and/or the set of resource definitions in a human interpretable format. In certain embodiments, the blueprint component 106 and/or the hybrid cloud composition component 108 can apply the modified blueprint and/or the set of resource definitions to hardware and/or software associated with the cloud-based computing platform 114.

It is to be appreciated that the orchestration engine component 102 (e.g., the computing resource component 104, the blueprint component 106 and/or the hybrid cloud composition component 108) performs an orchestration engine process that cannot be performed by a human (e.g., is greater than the capability of a single human mind). For example, an amount of data processed, a speed of processing of data and/or data types processed by the orchestration engine component 102 (e.g., the computing resource component 104, the blueprint component 106 and/or the hybrid cloud composition component 108) over a certain period of time can be greater, faster and different than an amount, speed and data type that can be processed by a single human mind over the same period of time. The orchestration engine component 102 (e.g., the computing resource component 104, the blueprint component 106 and/or the hybrid cloud composition component 108) can also be fully operational towards performing one or more other functions (e.g., fully powered on, fully executed, etc.) while also performing the above-referenced orchestration engine process. Moreover, the orchestration engine component 102 (e.g., the computing resource component 104, the blueprint component 106 and/or the hybrid cloud composition component 108) can include information that is impossible to obtain manually by a user. For example, a type of information included in the set of resource definitions, an amount of information included in the set of resource definitions and/or a variety of information included in the set of resource definitions can be more complex than information obtained manually by a user.

Figure 2:
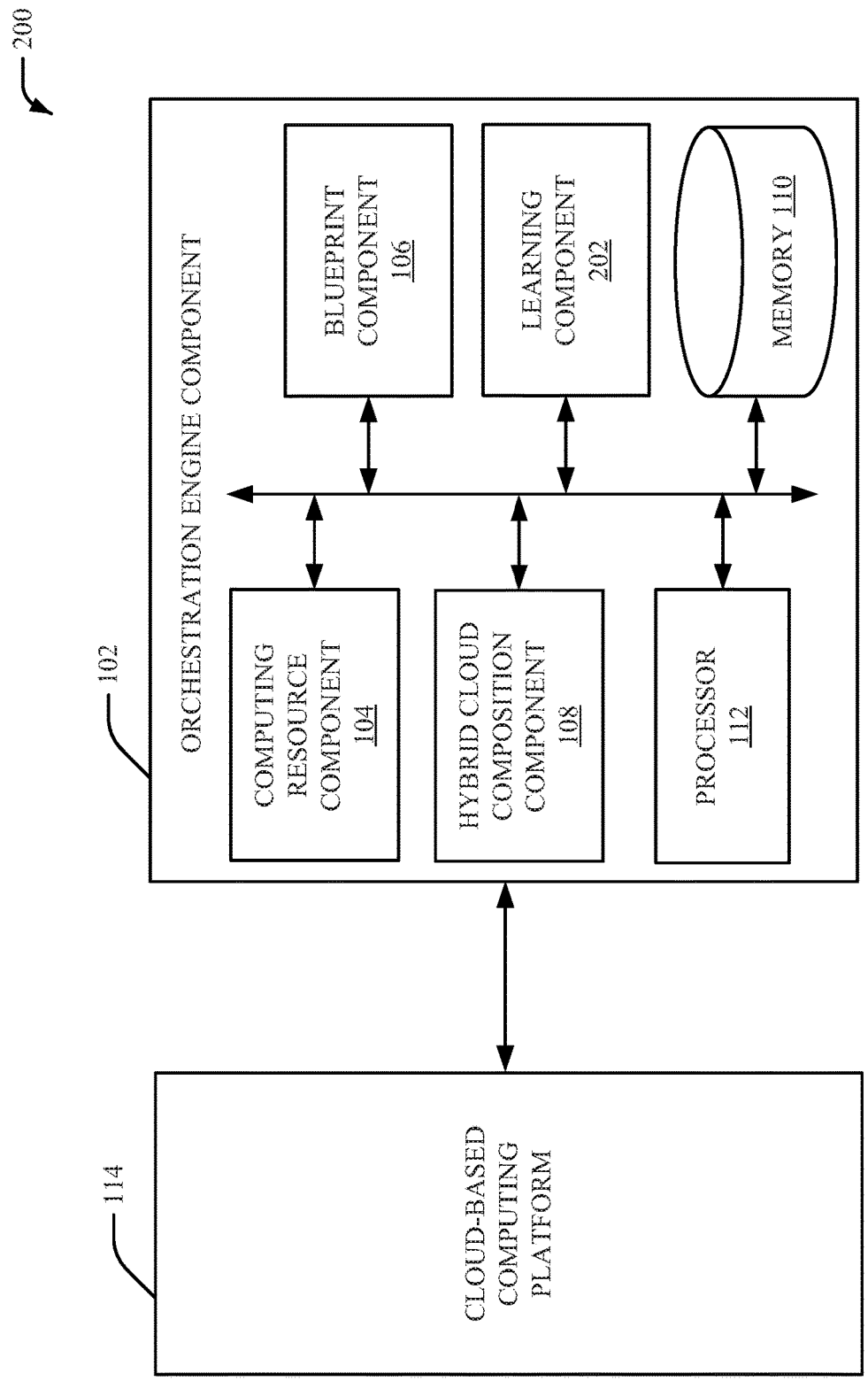
FIG. 2 illustrates a block diagram of another example, non-limiting system that includes an orchestration engine component in accordance with one or more embodiments described herein.

FIG. 2 illustrates a block diagram of an example, non-limiting system 200 in accordance with one or more embodiments described herein. Repetitive description of like elements employed in other embodiments described herein is omitted for sake of brevity.

The system 200 includes the orchestration engine component 102. The orchestration engine component 102 can include the computing resource component 104, the blueprint component 106, the hybrid cloud composition component 108, and a learning component 202. The learning component 202 can monitor the cloud-based computing platform 114 to facilitate learning of one or more features and/or information related to one or more resources associated with the cloud-based computing platform 114. For example, the learning component 202 can monitor the cloud-based computing platform 114 based on the one or more blueprint-level aspects to learn one or more features and/or information related to one or more resources associated with the cloud-based computing platform 114. In an embodiment, the learning component 202 can employ machine learning and/or principles of artificial intelligence to learn one or more features and/or information related to one or more resources associated with the cloud-based computing platform 114. The learning component 202 can perform learning with respect to learning one or more features and/or information related to one or more resources associated with the cloud-based computing platform 114 explicitly or implicitly. In an aspect, the learning component 202 can learn one or more features and/or information related to one or more resources associated with the cloud-based computing platform 114 based on classifications, correlations, inferences and/or expressions associated with principles of artificial intelligence. For instance, the learning component 202 can employ an automatic classification system and/or an automatic classification process to learn one or more features and/or information related to one or more resources associated with the cloud-based computing platform 114. In one example, the learning component 202 can employ a probabilistic and/or statistical-based analysis (e.g., factoring into the analysis utilities and costs) to learn and/or generate inferences with respect to the cloud-based computing platform 114. In an aspect, the learning component 202 can include an inference component (not shown) that can further enhance automated aspects of the learning component 202 utilizing in part inference based schemes to learn one or more features and/or information related to one or more resources associated with the cloud-based computing platform 114.

The learning component 202 can employ any suitable machine-learning based techniques, statistical-based techniques and/or probabilistic-based techniques. For example, the learning component 202 can employ expert systems, fuzzy logic, SVMs, Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, etc. In another aspect, the learning component 202 can perform a set of machine learning computations associated with learning one or more features and/or information related to one or more resources associated with the cloud-based computing platform 114. For example, the learning component 202 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, and/or a set of different machine learning computations to learn one or more features and/or information related to one or more resources associated with the cloud-based computing platform 114. In certain embodiments, the learning component 202 can be employed to apply a certain degree of random variation to one or more blueprint-level aspects to learn one or more parameters for a blueprint-level aspect. For example, the learning component 202 can alter a monitoring aspect parameter, an alarm aspect parameter, a load-balancing aspect parameter, and/or another aspect parameters to monitor workload performance of the cloud-based computing platform 114. As such, the learning component 202 can learn and/or modify one or more aspect parameters for a blueprint associated with the cloud-based computing platform 114. In an embodiment, the learning component 202 can dynamically alter and/or control an amount of random variation for one or more blueprint-level aspects. In another embodiment, the learning component 202 can alter a first resource within a blueprint to a second resource based on an estimated risk level associated with the first resource, an estimated benefit (e.g. cost, performance, security, reliability, robustness, business impact, etc.) of using the second resource, etc. In one example, the estimated risk level associated with the first resource can be a scalar value. In another example, the estimated risk value associated with the first resource can be a multidimensional vector. In yet another example, the estimated risk level associated with the first resource can include a confidence value. Furthermore, based on content of a blueprint-level aspect for a resource within a blueprint, a first resource within a blueprint can be altered to a second resource.

Figure 3:
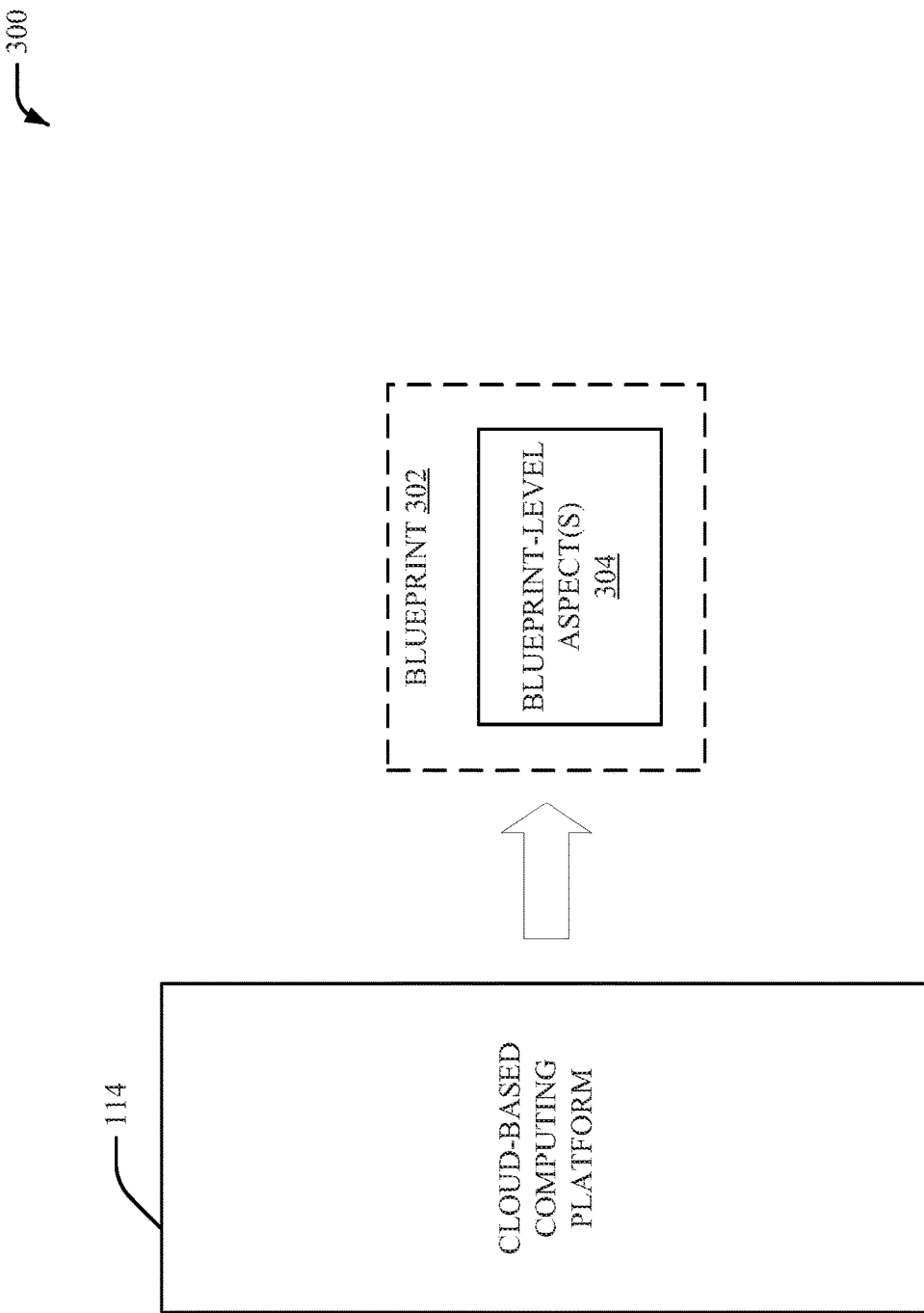
FIG. 3 illustrates an example, non-limiting system that includes a cloud-based computing platform and a blueprint in accordance with one or more embodiments described herein.

FIG. 3 illustrates a block diagram of an example, non-limiting system 300 in accordance with one or more embodiments described herein. Repetitive description of like elements employed in other embodiments described herein is omitted for sake of brevity.

The system 300 includes the cloud-based computing platform 114. A blueprint 302 can be generated based on the cloud-based computing platform 114. In an embodiment, the blueprint 302 can be provided by the cloud-based computing platform 114. In another embodiment, the blueprint 302 can be generated by analyzing the cloud-based computing platform 114. The blueprint 302 can be a template or a pattern that declares one or more computing resources for the cloud-based computing platform 114. The blueprint 302 can also describe a type of computing resource and/or properties for a computing resource that is created for the cloud-based computing platform 114. In an aspect, the blueprint 302 can be exported from the cloud-based computing platform 114 as a readable text file. In another aspect, the blueprint 302 can be formatted in a machine-readable format and a human-readable format. For example, the blueprint 302 can be a machine-readable representation and a human-readable representation of the one or more computing resources for the cloud-based computing platform 114. In one example, the blueprint 302 can be formatted in a machine-readable format and a human-readable format associated with a data serialization language. In another example, the blueprint 302 can be formatted in a machine-readable format and a human-readable format associated with a data array language. In yet another example, the blueprint 302 can be formatted in a machine-readable format and a human-readable format associated with automated documentation. In another aspect, the blueprint 302 can describe one or more attributes of the cloud-based computing platform 114 and/or one or more setting for the cloud-based computing platform 114. Additionally or alternatively, the blueprint 302 can describe a set of inter-related cloud resources of the cloud-based computing platform 114.

The blueprint 302 can include one or more blueprint-level aspects 304. The one or more blueprint-level aspects 304 can be specified for one or more resource definitions within the blueprint 302. For example, the one or more blueprint-level aspects 304 can be a description for one or more features and/or one or more qualities associated with one or more resources described in the blueprint 302. The resource definitions can be resource definitions for the cloud-based computing platform 114. Alternatively, one or more blueprint-level aspects 304 can be specified for an entire portion of the blueprint 302. In an embodiment, the one or more blueprint-level aspects 304 can include encoded data for the one or more resource definitions. For instance, the one or more blueprint-level aspects 304 can include encoded data such as, for example, service level agreement data, software data, deployment environment data, cost data, security data, response time data, dependency data, deadline data, description data, benchmark data, maintainer data, and/or other data associated with the cloud-based computing platform 114.

The one or more blueprint-level aspects 304 can affect, change, and/or add a property or resource in the blueprint 302. A property or resource in the blueprint 302 can include, for example, a unique environment, monitoring capability, alert and/or auto-scaling feature based on information associated with the cloud-based computing platform 114. In an embodiment, the one or more blueprint-level aspects 304 can include a monitoring aspect. The monitoring aspect can, for example, collect and/or track metrics associated with the cloud-based computing platform 114, collect and/or monitor log files associated with the cloud-based computing platform 114, set one or more alarms associated with the cloud-based computing platform 114, automatically react to changes associated with the cloud-based computing platform 114, and/or facilitate one or more other monitoring features associated with the cloud-based computing platform 114. In one example, data for the monitoring aspect can be associated with an application performance monitoring tool employed for the cloud-based computing platform 114. Additionally or alternatively, the one or more blueprint-level aspects 304 can include a notification aspect. The notification aspect can track alarm configurations associated with the cloud-based computing platform 114, access one or more statistics associated with the cloud-based computing platform 114, collect metrics associated with the cloud-based computing platform 114, set one or more alarms for metric data associated with the cloud-based computing platform 114, identify one or more trends associated with the cloud-based computing platform 114, facilitate an automated action based on a state of the cloud-based computing platform 114, and/or facilitate one or more other notification features associated with the cloud-based computing platform 114. Additionally or alternatively, the one or more blueprint-level aspects 304 can include an auto-scaling aspect. The auto-scaling aspect can facilitate schedule-based scaling for the cloud-based computing platform 114 and/or resource-based scaling for the cloud-based computing platform 114. Schedule-based scaling can be associated with an expected increase in data traffic associated with the cloud-based computing platform 114. Resource-based scheduling can be associated with response time criterion for data provided by the cloud-based computing platform 114. In an aspect, the cloud-based computing platform 114 can include an auto scale group of identical servers and/or a load balancer defined by a launch configuration for the cloud-based computing platform 114. In one example, the auto scale group can be modified in response to a load associated with the cloud-based computing platform 114 and/or observed processing utilization by the cloud-based computing platform 114. Additionally or alternatively, the one or more blueprint-level aspects 304 can include a load-balancing aspect. The load-balancing aspect can manage distribution of traffic loads with the cloud-based computing platform 114. The load-balancing aspect can also manage traffic and/or resource usage of one or more server nodes with the cloud-based computing platform 114.

Figure 4:
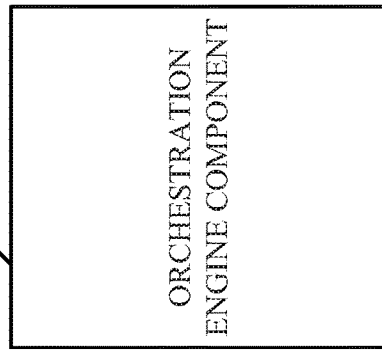
FIG. 4 illustrates an example, non-limiting system that includes an orchestration engine component, a blueprint and a set of resource definitions in accordance with one or more embodiments described herein.

FIG. 4 illustrates a block diagram of an example, non-limiting system 400 in accordance with one or more embodiments described herein. Repetitive description of like elements employed in other embodiments described herein is omitted for sake of brevity.

The system 400 includes the orchestration engine component 102. The orchestration engine component 102 can receive the blueprint 302 that includes the one or more blueprint-level aspects 304. Based on the one or more blueprint-level aspects 304 included in the blueprint 302, the orchestration engine component 102 can generate a set of resource definitions 402. For example, the orchestration engine component 102 can extract the one or more blueprint-level aspects 304 from the blueprint 302. Furthermore, the orchestration engine component 102 can analyze the one or more blueprint-level aspects 304 to generate the set of resource definitions 402. The set of resource definitions 402 can include one or more definitions for one or more resources associated with the cloud-based computing platform 114 and/or one or more properties associated with the cloud-based computing platform 114. In an aspect, the set of resource definitions 402 can include one or more definitions to facilitate monitoring, auto-scaling, load balancing, event management and/or persistence associated with the cloud-based computing platform 114. In an embodiment, the set of resource definitions 402 can include one or more definitions for hardware associated with the cloud-based computing platform 114, one or more definitions for software associated with the cloud-based computing platform 114, one or more definitions for one or more virtual machines associated with the cloud-based computing platform 114, one or more definitions for storage associated with the cloud-based computing platform 114, one or more definitions for middleware associated with the cloud-based computing platform 114, and/or one or more definitions for another resource associated with the cloud-based computing platform 114. In one example, the set of resource definitions 402 can include a number of processors and/or a type of processor for the cloud-based computing platform 114. Additionally or alternatively, the set of resource definitions 402 can include an amount of memory and/or a type of memory for the cloud-based computing platform 114. Additionally or alternatively, the set of resource definitions 402 can include a network speed for the cloud-based computing platform 114. However, it is to be appreciated that the set of resource definitions 402 can include a definition for other resources associated with the cloud-based computing platform 114.

Figure 5:
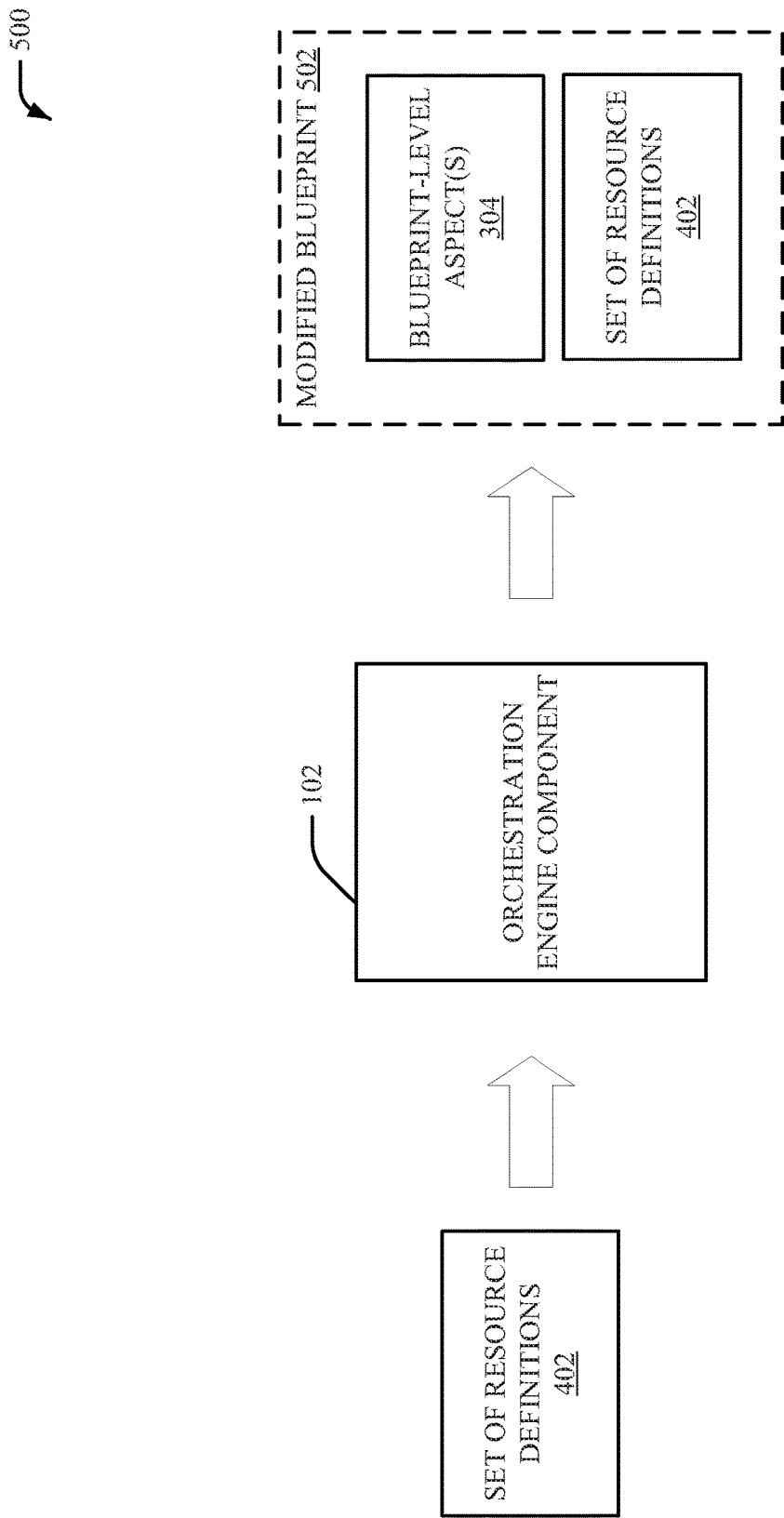
FIG. 5 illustrates an example, non-limiting system that includes an orchestration engine component, a set of resource definitions and a modified blueprint in accordance with one or more embodiments described herein.

FIG. 5 illustrates a block diagram of an example, non-limiting system 500 in accordance with one or more embodiments described herein. Repetitive description of like elements employed in other embodiments described herein is omitted for sake of brevity.

The system 500 includes the orchestration engine component 102. The orchestration engine component 102 can employ the set of resource definitions 402 generated by the orchestration engine component 102 to modify the blueprint 302. For instance, the orchestration engine component 102 can generate a modified blueprint 502 for the cloud-based computing platform 114. The modified blueprint 502 can be a modified version of the blueprint 302. The modified blueprint 502 can include the one or more blueprint-level aspects 304 and the set of resource definitions 402. For example, the orchestration engine component 102 can insert the set of resource definitions 402 into the blueprint 302 to facilitate generation of the modified blueprint 502 that includes the one or more blueprint-level aspects 304 and the set of resource definitions 402. In an aspect, one or more portions of resources properties within the modified blueprint 502 can be are autocompleted based on information included in the set of resource definitions 402. For example, one or more portions of resources properties within the modified blueprint 502 can be added, updated and/or deleted based on information included in the set of resource definitions 402.

Figure 6:
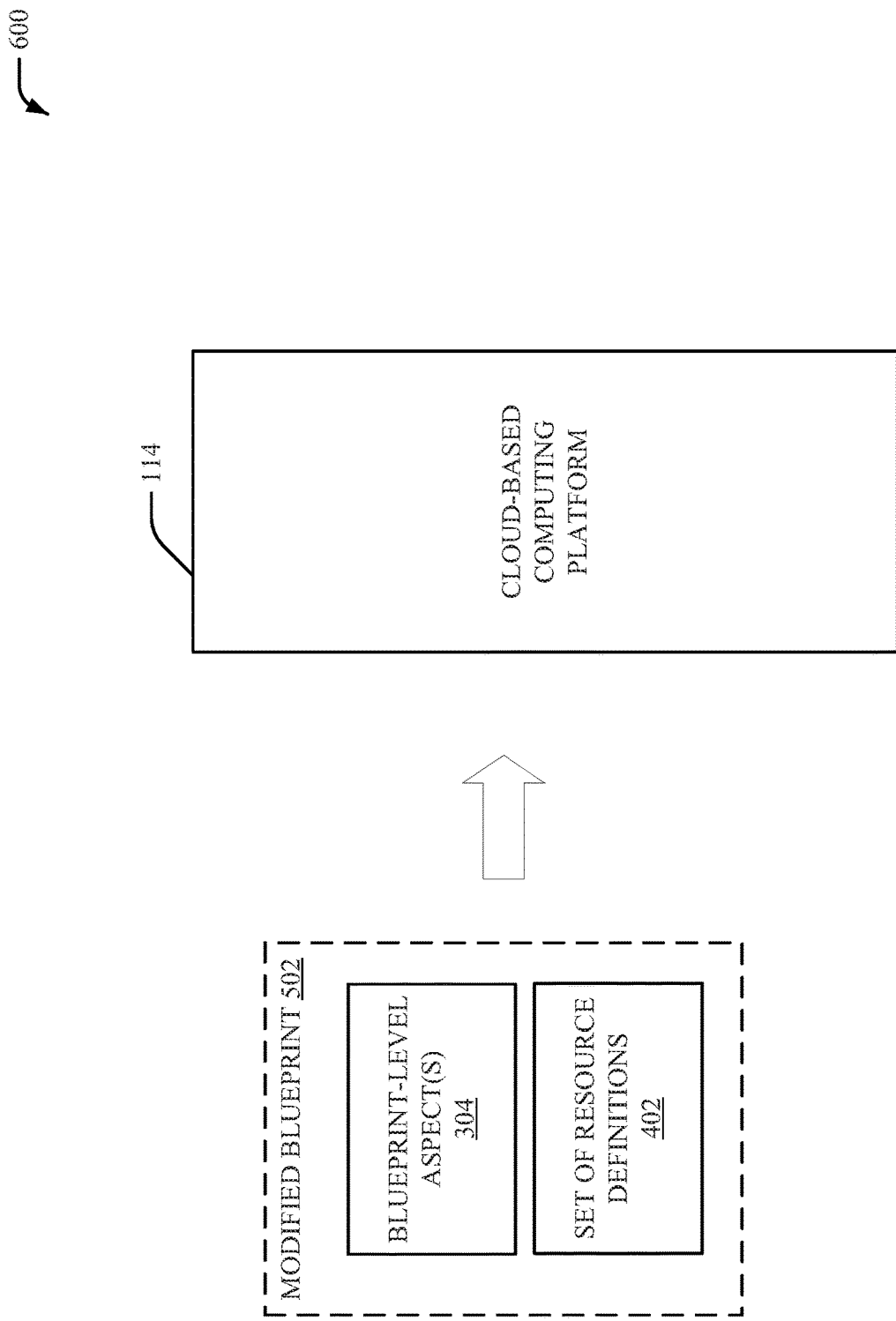
FIG. 6 illustrates an example, non-limiting system that includes a cloud-based computing platform and a modified blueprint in accordance with one or more embodiments described herein.

FIG. 6 illustrates a block diagram of an example, non-limiting system 600 in accordance with one or more embodiments described herein. Repetitive description of like elements employed in other embodiments described herein is omitted for sake of brevity.

The system 600 includes the cloud-based computing platform 114. In an embodiment, the modified blueprint 502 that includes the one or more blueprint-level aspects 304 and the set of resource definitions 402 can be employed by the cloud-based computing platform 114. In one embodiment, the modified blueprint 502 can be employed by the cloud-based computing platform 114 to determine an optimal path of execution for hardware and/or software associated with the cloud-based computing platform 114. In certain embodiments, the modified blueprint 502 can be transmitted to the cloud-based computing platform 114 to facilitate employment of the modified blueprint 502 by the cloud-based computing platform 114. Accordingly, one or more computing resource requirements for the cloud-based computing platform 114 can be translated into hardware properties and/or software properties for the cloud-based computing platform 114. For example, operating system requirements, memory requirements, processing requirements and/or other requirements for the cloud-based computing platform 114 can be efficiently determined. Moreover, efficiency and/or performance of the cloud-based computing platform 114 can be improved. For example, efficiency and/or performance of hardware and/or software included in the cloud-based computing platform 114 can be improved.

Figure 7:
FIG. 7 illustrates an example, non-limiting system that includes a blueprint and a modified blueprint in accordance with one or more embodiments described herein.

FIG. 7 illustrates a block diagram of an example, non-limiting system 700 in accordance with one or more embodiments described herein. Repetitive description of like elements employed in other embodiments described herein is omitted for sake of brevity.

The system 700 includes a blueprint 702. The blueprint 702 can be a blueprint associated with the cloud-based computing platform 114. Furthermore, the blueprint 702 can be a blueprint employed by the orchestration engine component 102. For example, the blueprint 702 can correspond to the blueprint 302. The blueprint 702 can define one or more resources to create for the cloud-based computing platform 114. The blueprint 702 can define relationships and/or dependencies between one or more resources for the cloud-based computing platform 114. For example, storage associated with the cloud-based computing platform 114 can require an association with a virtual machine of the cloud-based computing platform 114, thereby creating a dependency for the storage. Dependencies between resources for the cloud-based computing platform 114 can facilitate creation of one or more resources in a correct order. Furthermore, one or more resources can be uniquely named within the blueprint 702. A resource in the blueprint 702 can include a property value that is explicitly set to a defined value. Additionally or alternatively, a resource in the blueprint 702 can include a property value that is implicitly set via a reference to a property from a different resource in the blueprint 702. Additionally or alternatively, a resource in the blueprint 702 can include a property value that is implicitly set via a reference to an input parameter to the blueprint 702. In an embodiment, the blueprint 702 can be a nested data structure. Furthermore, the blueprint 702 can exchange data with one or more other blueprints for the cloud-based computing platform 114.

In an embodiment, the blueprint 702 can be a template or a pattern that declares one or more computing resources for the cloud-based computing platform 114. The blueprint 702 can also describe a type of computing resource and/or properties for a computing resource that is created for the cloud-based computing platform 114. In an aspect, the blueprint 702 can be exported from the cloud-based computing platform 114 as a readable text file. In another aspect, the blueprint 702 can be formatted in a machine-readable format and a human-readable format. For example, the blueprint 702 can be a machine-readable textual representation and a human-readable textual representation of the one or more computing resources for the cloud-based computing platform 114. In one example, the blueprint 702 can be formatted in a machine-readable format and a human-readable format associated with a data serialization language. In another example, the blueprint 702 can be formatted in a machine-readable format and a human-readable format associated with a data array language. In yet another example, the blueprint 702 can be formatted in a machine-readable format and a human-readable format associated with automated documentation.

The blueprint 702 can be transformed into a modified blueprint 704. The modified blueprint 704 can be a modified blueprint generated by the orchestration engine component 102. For example, the modified blueprint 704 can correspond to the modified blueprint 502. The modified blueprint 704 can include information from the blueprint 702 and new information 706. The new information 706 can be, for example, information associated with a set of resource definitions (e.g., the set of resource definitions 402) generated by the orchestration engine component 102. For example, the new information 706 can be a set of properties for the cloud-based computing platform 114 that is dynamically added based on one or more blueprint-level aspects included in the blueprint 702.

In an embodiment, the new information 706 can include one or more definitions for hardware associated with the cloud-based computing platform 114, one or more definitions for software associated with the cloud-based computing platform 114, one or more definitions for one or more virtual machines associated with the cloud-based computing platform 114, one or more definitions for storage associated with the cloud-based computing platform 114, one or more definitions for middleware associated with the cloud-based computing platform 114, and/or one or more definitions for another resource associated with the cloud-based computing platform 114. In a non-limiting example, the new information 706 can include a region associated with the cloud-based computing platform 114. Additionally or alternatively, the new information 706 can include a number of processors and/or a type of processor for the cloud-based computing platform 114. Additionally or alternatively, the new information 706 can include an amount of memory and/or a type of memory for the cloud-based computing platform 114. Additionally or alternatively, the new information 706 can include a network speed for the cloud-based computing platform 114. However, it is to be appreciated that the new information 706 can include a definition for one or more other resources associated with the cloud-based computing platform 114.

FIG. 8 illustrates a block diagram of an example, non-limiting system 800 in accordance with one or more embodiments described herein. Repetitive description of like elements employed in other embodiments described herein is omitted for sake of brevity.

The system 800 includes the blueprint 702 and a modified blueprint 802. The blueprint 702 can be transformed into the modified blueprint 802. The modified blueprint 802 can be a modified blueprint generated by the orchestration engine component 102. For example, the modified blueprint 802 can correspond to the modified blueprint 502. The modified blueprint 802 can include information from the blueprint 702 and new information 804. The new information 804 can be, for example, information associated with a set of resource definitions (e.g., the set of resource definitions 402) generated by the orchestration engine component 102. For example, the new information 804 can be a set of resource definitions and a set of properties for the cloud-based computing platform 114 that are dynamically added based on one or more blueprint-level aspects included in the blueprint 702.

In an embodiment, the new information 804 can include one or more definitions for hardware associated with the cloud-based computing platform 114, one or more definitions for software associated with the cloud-based computing platform 114, one or more definitions for one or more virtual machines associated with the cloud-based computing platform 114, one or more definitions for storage associated with the cloud-based computing platform 114, one or more definitions for middleware associated with the cloud-based computing platform 114, and/or one or more definitions for another resource associated with the cloud-based computing platform 114. In a non-limiting example, the new information 804 can include a region associated with the cloud-based computing platform 114. Additionally or alternatively, the new information 804 can include a number of processors and/or a type of processor for the cloud-based computing platform 114. Additionally or alternatively, the new information 804 can include an amount of memory and/or a type of memory for the cloud-based computing platform 114. Additionally or alternatively, the new information 804 can include a network speed for the cloud-based computing platform 114. The new information 804 can additionally or alternatively include a resource definition and corresponding properties for storage (e.g., a database) associated with the cloud-based computing platform 114. However, it is to be appreciated that the new information 804 can include a definition for one or more other resources associated with the cloud-based computing platform 114.

Figure 9:
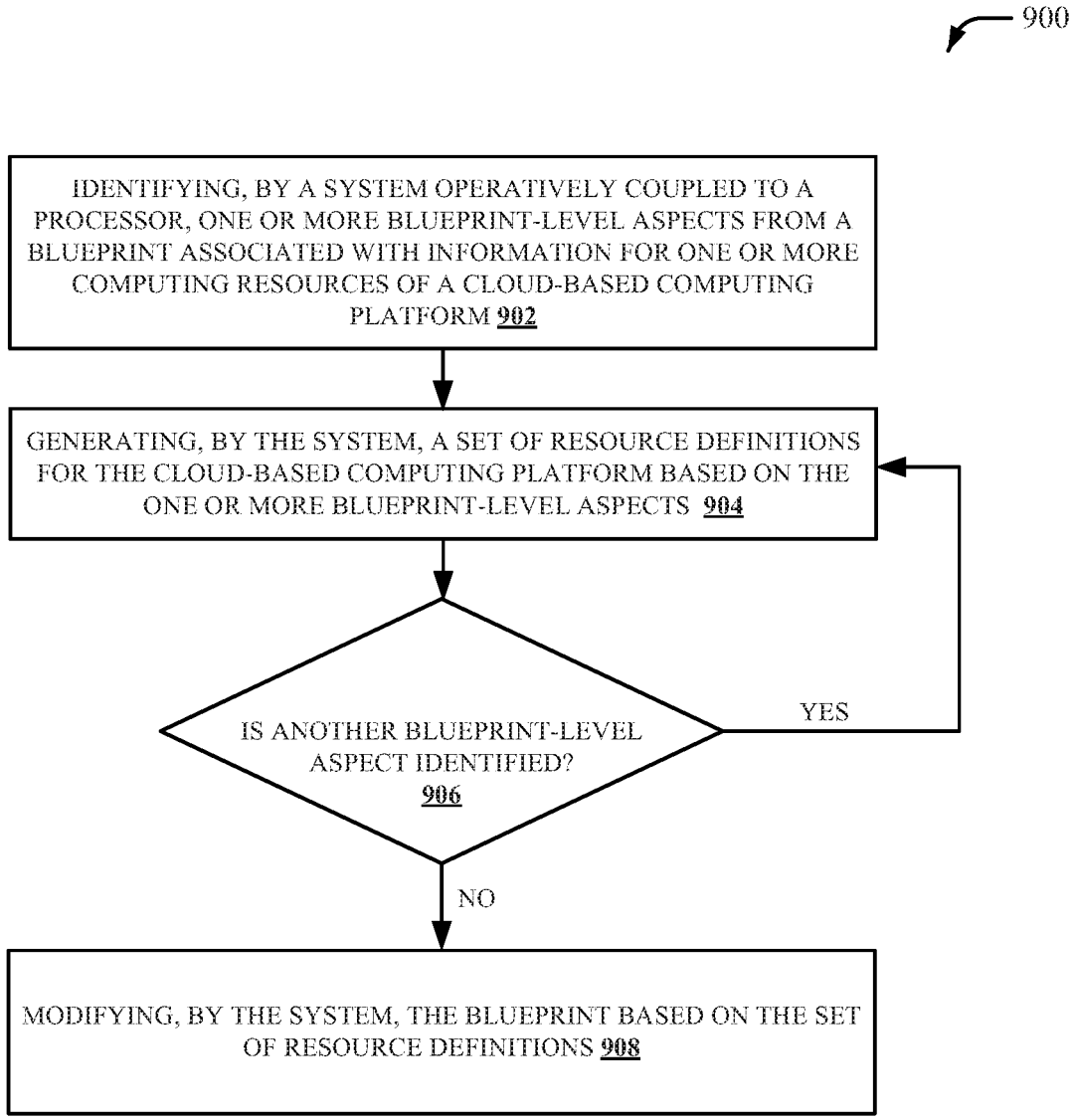
FIG. 9 illustrates a flow diagram of an example, non-limiting computer-implemented method for facilitating orchestration engine blueprint aspects for hybrid cloud composition in accordance with one or more embodiments described herein.

FIG. 9 illustrates a flow diagram of an example, non-limiting computer-implemented method 900 that facilitates orchestration engine blueprint aspects for hybrid cloud composition in accordance with one or more embodiments described herein. At 902, one or more blueprint-level aspects are identified, by a system operatively coupled to a processor (e.g., by computing resource component 104), from a blueprint associated with information for one or more computing resources of a cloud-based computing platform. The blueprint can be, for example, a template or a pattern that declares one or more computing resources for the cloud-based computing platform. The blueprint can also describe a type of computing resource and/or properties for a computing resource that is created for the cloud-based computing platform. In an aspect, the blueprint can be a machine-readable representation and a human-readable representation of one or more computing resources associated with the cloud-based computing platform. In one example, the blueprint can be formatted in a machine-readable format and a human-readable format associated with a data serialization language. In another example, the blueprint can be formatted in a machine-readable format and a human-readable format associated with a data array language. In yet another example, the blueprint can be formatted in a machine-readable format and a human-readable format associated with automated documentation. The one or more blueprint-level aspects can be indicative of encoded information for one or more features associated with one or more computing resources for the cloud-based computing platform. The encoded data within the one or more blueprint-level aspects can include, for example, service level agreement data, software data, deployment environment data, cost data, security data, response time data, dependency data, deadline data, description data, benchmark data, maintainer data, and/or other data associated with the cloud-based computing platform. In an embodiment, the one or more blueprint-level aspects can be identified based on historical data associated with the cloud-based computing platform.

At 904, a set of resource definitions for the cloud-based computing platform is generated, by the system (e.g., by blueprint component 106), based on the one or more blueprint-level aspects. The set of resource definitions can include one or more definitions to facilitate monitoring, auto-scaling, load balancing, event management and/or persistence associated with the cloud-based computing platform. In an aspect, the set of resource definitions can include one or more definitions for hardware associated with the cloud-based computing platform, software associated with the cloud-based computing platform, a virtual machine associated with the cloud-based computing platform, storage associated with the cloud-based computing platform, middleware associated with the cloud-based computing platform, and/or another resource associated with the cloud-based computing platform. In one example, the set of resource definitions can include a number of processors and/or a type of processor for the cloud-based computing platform. Additionally or alternatively, the set of resource definitions can include an amount of memory and/or a type of memory for the cloud-based computing platform. Additionally or alternatively, the set of resource definitions can include a network speed for the cloud-based computing platform.

At 906, it is determined whether another blueprint-level aspect is identified. If yes, the computer-implemented method 900 returns to 904 to updated the set of resource definitions. If no, the computer-implemented method 900 proceeds to 908.

At 908, the blueprint is modified, by the system (e.g., by hybrid cloud composition component 108), based on the set of resource definitions. For example, the set of resource definitions can be inserted into the blueprint. In an embodiment, a resource definition portion within the blueprint can be modified based on the set of resource definitions. For example, a resource definition portion within the blueprint can be created, updated, configured and/or deleted based on the set of resource definitions. In certain embodiments, the computer-implemented method 900 can also include monitoring, by the system, the cloud-based computing platform based on the one or more blueprint-level aspects to learn one or more features associated with the cloud-based computing platform.

Figure 10:
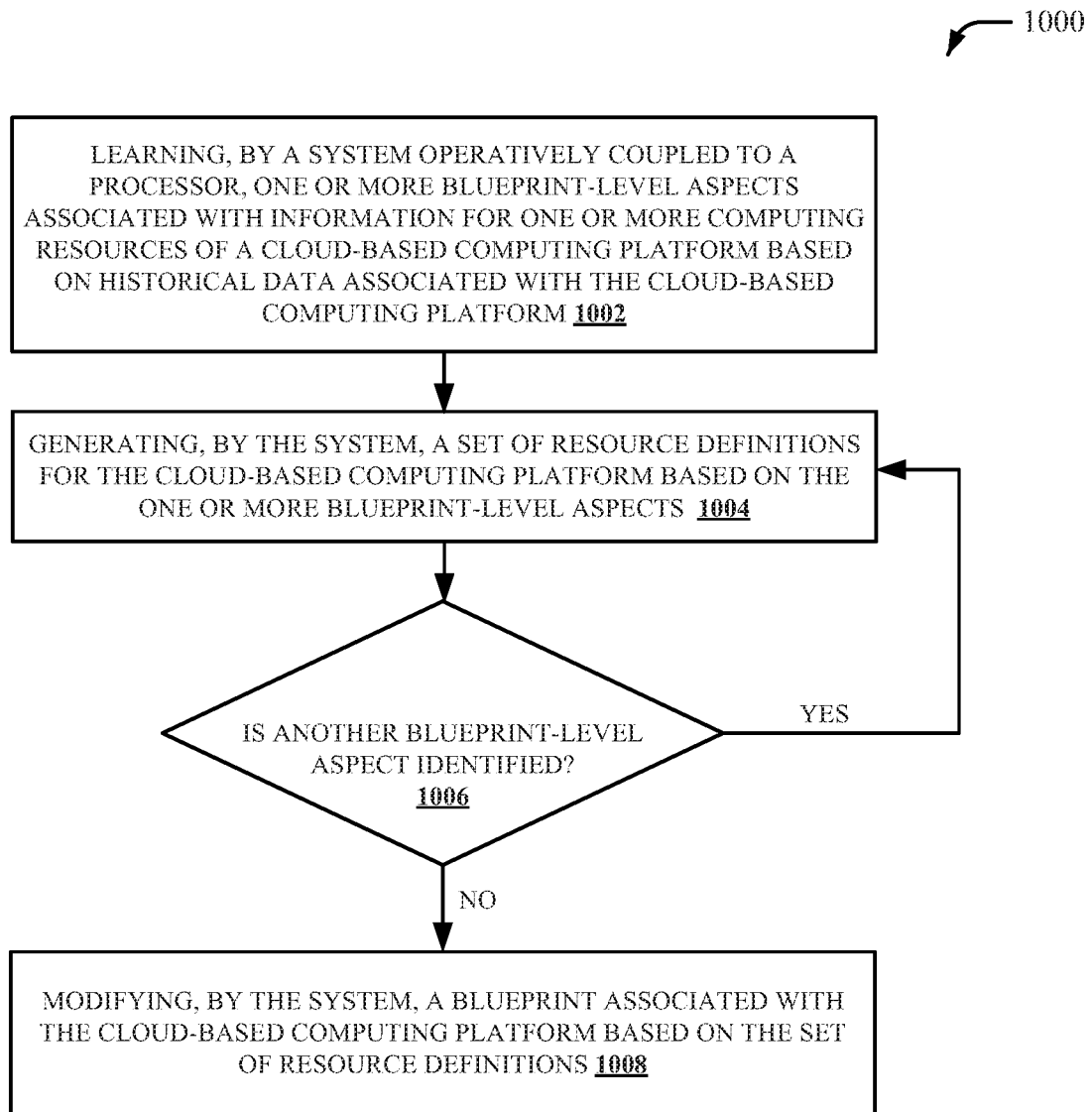
FIG. 10 illustrates a flow diagram of another example, non-limiting computer-implemented method for facilitating orchestration engine blueprint aspects for hybrid cloud composition in accordance with one or more embodiments described herein.

FIG. 10 illustrates a flow diagram of an example, non-limiting computer-implemented method 1000 that facilitates orchestration engine blueprint aspects for hybrid cloud composition in accordance with one or more embodiments described herein. At 1002, one or more blueprint-level aspects associated with information for one or more computing resources of a cloud-based computing platform are learned, by a system operatively coupled to a processor (e.g., by learning component 202), based on historical data associated with the cloud-based computing platform. The one or more blueprint-level aspects can be indicative of encoded information for one or more features associated with one or more computing resources for the cloud-based computing platform. The encoded data within the one or more blueprint-level aspects can include, for example, service level agreement data, software data, deployment environment data, cost data, security data, response time data, dependency data, deadline data, description data, benchmark data, maintainer data, and/or other data associated with the cloud-based computing platform. In an embodiment, the historical data can include previously determined performance data associated with the cloud-based computing platform, previously determined information for computing resources associated with the cloud-based computing platform, previously determined features associated with the cloud-based computing platform, information regarding previously determined blueprint-level aspects associated with the cloud-based computing platform and/or other historical data associated with the cloud-based computing platform.

At 1004, a set of resource definitions for the cloud-based computing platform is generated, by the system (e.g., by blueprint component 106), based on the one or more blueprint-level aspects. The set of resource definitions can include one or more definitions to facilitate monitoring, auto-scaling, load balancing, event management and/or persistence associated with the cloud-based computing platform. In an aspect, the set of resource definitions can include one or more definitions for hardware associated with the cloud-based computing platform, software associated with the cloud-based computing platform, a virtual machine associated with the cloud-based computing platform, storage associated with the cloud-based computing platform, middleware associated with the cloud-based computing platform, and/or another resource associated with the cloud-based computing platform. In one example, the set of resource definitions can include a number of processors and/or a type of processor for the cloud-based computing platform. Additionally or alternatively, the set of resource definitions can include an amount of memory and/or a type of memory for the cloud-based computing platform. Additionally or alternatively, the set of resource definitions can include a network speed for the cloud-based computing platform.

At 1006, it is determined whether another blueprint-level aspect is identified. If yes, the computer-implemented method 1000 returns to 1004 to updated the set of resource definitions. If no, the computer-implemented method 1000 proceeds to 1008.

At 1008, a blueprint associated with the cloud-based computing platform is modified, by the system (e.g., by hybrid cloud composition component 108), based on the set of resource definitions. For example, data associated with the set of resource definitions can be inserted into the blueprint. The blueprint can be, for example, a template or a pattern that declares one or more computing resources for the cloud-based computing platform. The blueprint can also describe a type of computing resource and/or properties for a computing resource that is created for the cloud-based computing platform. In an aspect, the blueprint can be a machine-readable representation and a human-readable representation of one or more computing resources associated with the cloud-based computing platform. In one example, the blueprint can be formatted in a machine-readable format and a human-readable format associated with a data serialization language. In another example, the blueprint can be formatted in a machine-readable format and a human-readable format associated with a data array language. In yet another example, the blueprint can be formatted in a machine-readable format and a human-readable format associated with automated documentation. In an embodiment, a resource definition portion within the blueprint can be modified based on the set of resource definitions. For example, a resource definition portion within the blueprint can be created, updated, configured and/or deleted based on the set of resource definitions. In certain embodiments, the computer-implemented method 1000 can also include monitoring, by the system, the cloud-based computing platform based on the one or more blueprint-level aspects to learn one or more features associated with the cloud-based computing platform.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because at least generating a set of resource definitions is established from a combination of electrical and mechanical components and circuitry, a human is unable to replicate or perform processing performed by the orchestration engine component 102 (e.g., the computing resource component 104, the blueprint component 106, the hybrid cloud composition component 108, and/or the learning component 202) disclosed herein. For example, a human is unable to generate a set of resource definitions based on one or more blue-print level aspects, human is unable to modify a blueprint based on a set of resource definitions, etc.

Figure 11:
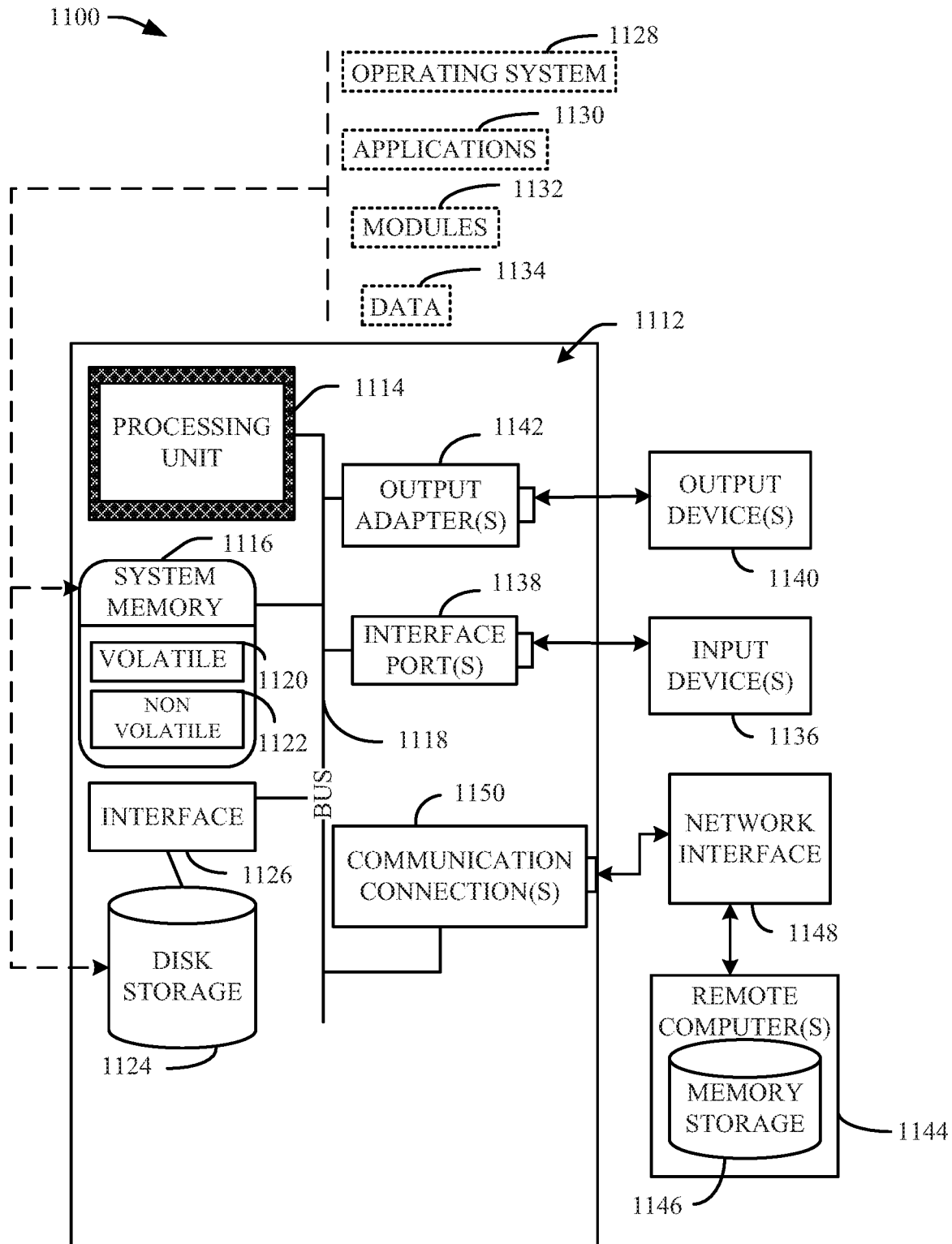
FIG. 11 illustrates a block diagram of an example, non-limiting operating environment in which one or more embodiments described herein can be facilitated.

In order to provide a context for the various aspects of the disclosed subject matter, FIG. 11 as well as the following discussion are intended to provide a general description of a suitable environment in which the various aspects of the disclosed subject matter can be implemented. FIG. 11 illustrates a block diagram of an example, non-limiting operating environment in which one or more embodiments described herein can be facilitated. Repetitive description of like elements employed in other embodiments described herein is omitted for sake of brevity.

With reference to FIG. 11, a suitable operating environment 1100 for implementing various aspects of this disclosure can also include a computer 1112. The computer 1112 can also include a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114. The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1116 can also include volatile memory 1120 and nonvolatile memory 1122. The basic input/output system (BIOS), containing the basic routines to transfer information between elements within the computer 1112, such as during start-up, is stored in nonvolatile memory 1122. Computer 1112 can also include removable/non-removable, volatile/non-volatile computer storage media. FIG. 11 illustrates, for example, a disk storage 1124. Disk storage 1124 can also include, but is not limited to, devices like a magnetic disk drive, floppy disk drive, tape drive, Jaz drive, Zip drive, LS-100 drive, flash memory card, or memory stick. The disk storage 1124 also can include storage media separately or in combination with other storage media. To facilitate connection of the disk storage 1124 to the system bus 1118, a removable or non-removable interface is typically used, such as interface 1126. FIG. 11 also depicts software that acts as an intermediary between users and the basic computer resources described in the suitable operating environment 1100. Such software can also include, for example, an operating system 1128. Operating system 1128, which can be stored on disk storage 1124, acts to control and allocate resources of the computer 1112.

System applications 1130 take advantage of the management of resources by operating system 1128 through program modules 1132 and program data 1134, e.g., stored either in system memory 1116 or on disk storage 1124. It is to be appreciated that this disclosure can be implemented with various operating systems or combinations of operating systems. A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port can be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a computer, a server, a router, a network PC, a workstation, a microprocessor based appliance, a peer device or other common network node and the like, and typically can also include many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1150 refers to the hardware/software employed to connect the network interface 1148 to the system bus 1118. While communication connection 1150 is shown for illustrative clarity inside computer 1112, it can also be external to computer 1112. The hardware/software for connection to the network interface 1148 can also include, for exemplary purposes only, internal and external technologies such as, modems including regular telephone grade modems, cable modems and DSL modems, ISDN adapters, and Ethernet cards.

Figure 12:
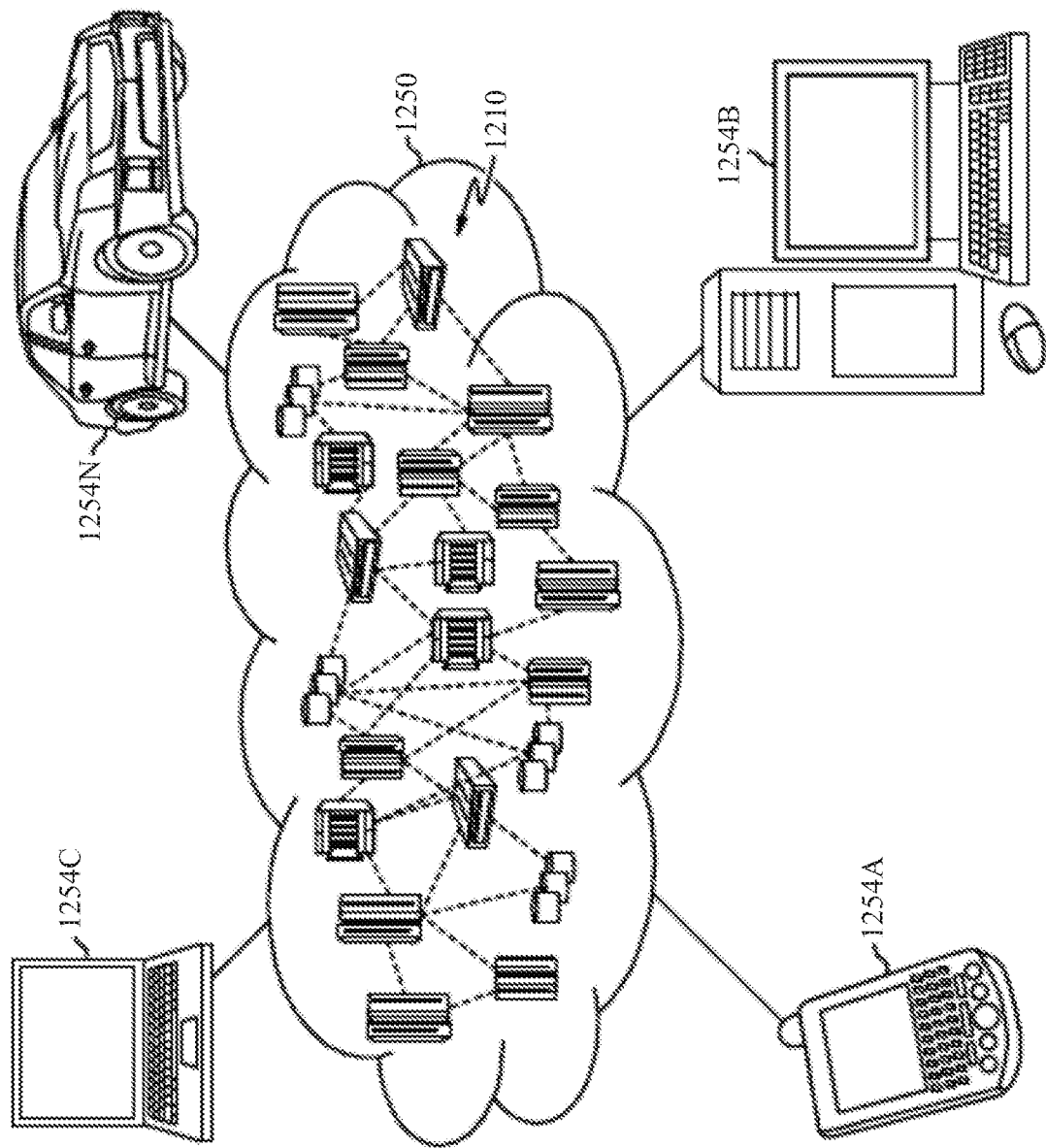
FIG. 12 illustrates a block diagram of an example, non-limiting cloud computing environment in accordance with one or more embodiments of the present invention.

Referring now to FIG. 12, an illustrative cloud computing environment 1250 is depicted. As shown, cloud computing environment 1250 includes one or more cloud computing nodes 1210 with which local computing devices used by cloud consumers, such as, for example, personal digital assistant (PDA) or cellular telephone 1254A, desktop computer 1254B, laptop computer 1254C, and/or automobile computer system 1254N may communicate. Nodes 1210 may communicate with one another. They may be grouped (not shown) physically or virtually, in one or more networks, such as Private, Community, Public, or Hybrid clouds as described hereinabove, or a combination thereof. This allows cloud computing environment 1250 to offer infrastructure, platforms and/or software as services for which a cloud consumer does not need to maintain resources on a local computing device. It is understood that the types of computing devices 1254A-N shown in FIG. 12 are intended to be illustrative only and that computing nodes 1210 and cloud computing environment 1250 can communicate with any type of computerized device over any type of network and/or network addressable connection (e.g., using a web browser).

Figure 13:
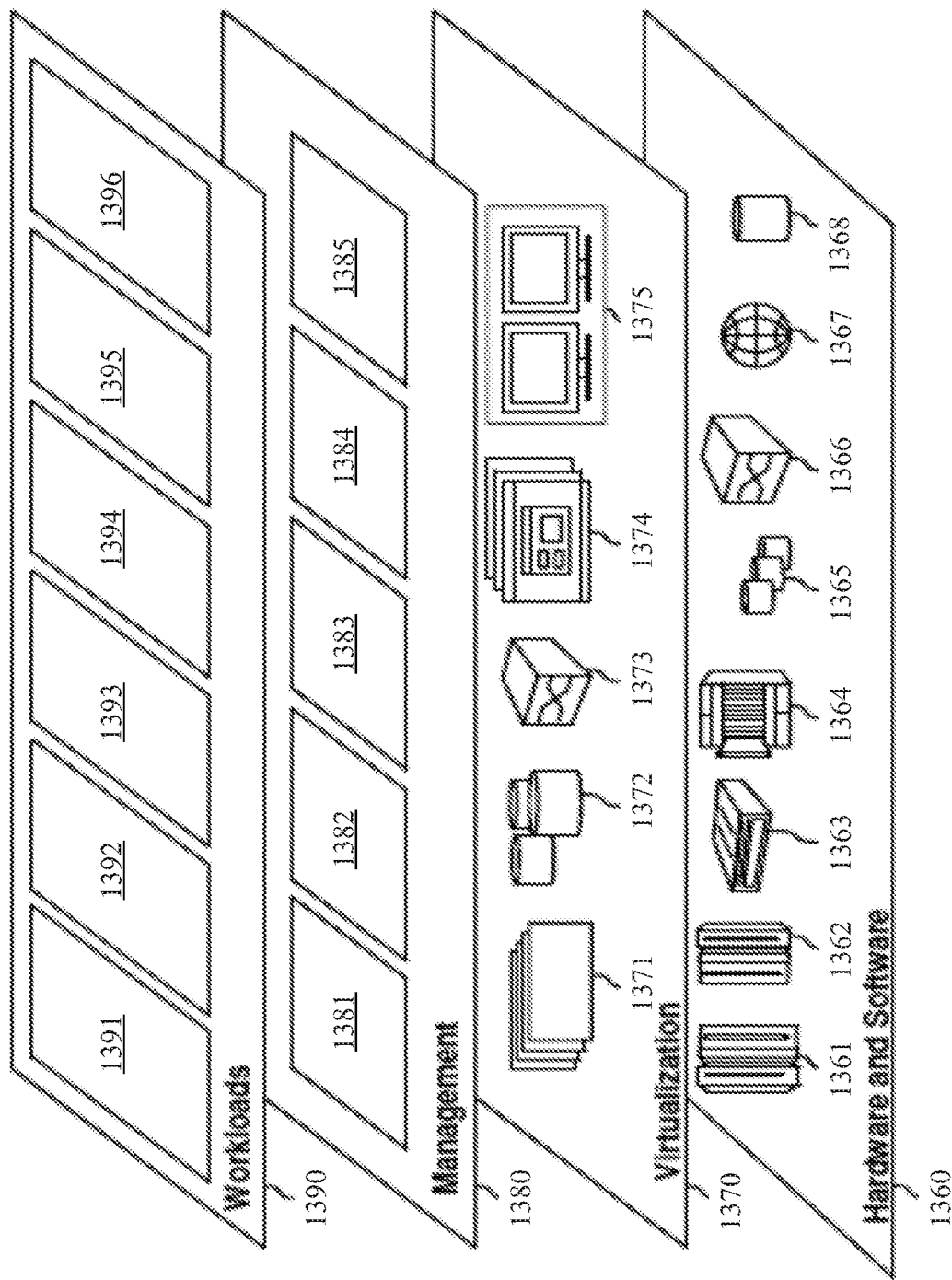
FIG. 13 illustrates a block diagram of example, non-limiting abstraction model layers in accordance with one or more embodiments of the present invention.

Referring now to FIG. 13, a set of functional abstraction layers provided by cloud computing environment 1250 (FIG. 12) is shown. It should be understood in advance that the components, layers, and functions shown in FIG. 13 are intended to be illustrative only and embodiments of the invention are not limited thereto. As depicted, the following layers and corresponding functions are provided:

Hardware and software layer 1360 includes hardware and software components. Examples of hardware components include: mainframes 1361; RISC (Reduced Instruction Set Computer) architecture based servers 1362; servers 1363; blade servers 1364; storage devices 1365; and networks and networking components 1366. In some embodiments, software components include network application server software 1367 and database software 1368.

Virtualization layer 1370 provides an abstraction layer from which the following examples of virtual entities may be provided: virtual servers 1371; virtual storage 1372; virtual networks 1373, including virtual private networks; virtual applications and operating systems 1374; and virtual clients 1375.

In one example, management layer 1380 may provide the functions described below. Resource provisioning 1381 provides dynamic procurement of computing resources and other resources that are utilized to perform tasks within the cloud computing environment. Metering and Pricing 1382 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1383 provides access to the cloud computing environment for consumers and system administrators. Service level management 1384 provides cloud computing resource allocation and management such that required service levels are met. Service Level Agreement (SLA) planning and fulfillment 1385 provide pre-arrangement for, and procurement of, cloud computing resources for which a future requirement is anticipated in accordance with an SLA.

Workloads layer 1390 provides examples of functionality for which the cloud computing environment may be utilized. Non-limiting examples of workloads and functions which may be provided from this layer include: mapping and navigation 1391; software development and lifecycle management 1392; virtual classroom education delivery 1393; data analytics processing 1394; transaction processing 1395; and orchestration engine process software 1396.

The present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components; and
a processor that executes computer executable components stored in the memory, wherein the computer executable components comprise:
a blueprint component that determines one or more blueprint-level aspects for a blueprint associated with a cloud-based computing platform, wherein the one or more blueprint-level aspects are indicative of encoded information for one or more features associated with one or more computing resources for the cloud-based computing platform;
a hybrid cloud composition component that determines a set of resource definitions for the cloud-based computing platform based on the one or more blueprint-level aspects;
a learning component that monitors the cloud-based computing platform based on the one or more blueprint-level aspects to learn one or more features associated with the cloud-based computing platform; and
an inference component that enhances one or more automated aspects of the learning component utilizing inference based schemes to learn one or more features related to one or more computing resources, wherein the learning component alters a first resource within the blueprint to a second resource distinct from the first resource and wherein the altering the first resource is based on an estimated risk level associated with the first resource, wherein the estimated risk level is a multidimensional vector and includes a confidence value.

2. The system of claim 1, wherein the computer executable components further comprise:
a computing resource component that modifies a previous version of the one or more computing resources to generate the one or more computing resources for the cloud-based computing platform.

3. The system of claim 2, wherein the computing resource component generates the one or more computing resources for a hybrid cloud-based computing platform, a public cloud-based computing platform, or a private cloud-based computing platform.

4. The system of claim 1, wherein the blueprint component determines the one or more blueprint-level aspects for a resource definition portion within the blueprint.

5. The system of claim 1, wherein the blueprint component determines encoded data within the one or more blueprint-level aspects from a group consisting of service level agreement data, software data, deployment environment data, cost data, security data, response time data, dependency data, deadline data, description data, benchmark data, and maintainer data.

6. The system of claim 1, wherein the blueprint component determines the one or more blueprint-level aspects based on historical data associated with the cloud-based computing platform or another cloud-based computing platform.

7. The system of claim 1, wherein the blueprint component determines the one or more blueprint-level aspects based on previously determined performance data associated with the cloud-based computing platform or another cloud-based computing platform.

8. The system of claim 1, wherein the blueprint component modifies the blueprint to generate a modified blueprint that includes the set of resource definitions.

9. The system of claim 1, wherein hybrid cloud composition component dynamically populates the set of resource definitions with resource data based on the one or more blueprint-level aspects.

10. The system of claim 1, wherein the blueprint component extracts the one or more blueprint-level aspects from the blueprint, and wherein the blueprint is indicative of a machine-readable representation of the one or more computing resources.

11. The system of claim 1, wherein the hybrid cloud composition component determines the set of resource definitions to facilitate improved performance for the cloud-based computing platform.

12. A computer-implemented method, comprising:
identifying, by a system operatively coupled to a processor, one or more blueprint-level aspects from a blueprint associated with information for one or more computing resources of a cloud-based computing platform;

generating, by the system, a set of resource definitions for the cloud-based computing platform based on the one or more blueprint-level aspects;

modifying, by the system, the blueprint based on the set of resource definitions;

monitoring, by the system, the cloud-based computing platform based on the one or more blueprint-level aspects to learn one or more features associated with the cloud-based computing platform;

utilizing, by the system, inference based schemes to learn one or more features related to one or more computing resources, wherein automated aspects of the learning component are enhanced; and altering, by the system, a first resource within the blueprint to a second resource distinct from the first resource and wherein the altering the first resource is based on an estimated risk level associated with the first resource, wherein the estimated risk level is a multidimensional vector and includes a confidence value.

13. The computer-implemented method of claim 12, wherein the identifying comprises identifying the one or more blueprint-level aspects based on historical data associated with the cloud-based computing platform.

14. The computer-implemented method of claim 12, wherein the modifying comprises modifying a resource definition portion within the blueprint based on the set of resource definitions.

15. The computer-implemented method of claim 12, wherein the monitoring comprises altering a first resource within the blueprint to a second resource based on an estimated risk level associated with the first resource.

16. The computer-implemented method of claim 12, wherein the modifying comprises improving performance of the cloud-based computing platform.

17. A computer program product facilitating an orchestration engine process, the computer program product comprising a computer readable storage medium having program instructions embodied therewith, the program instructions executable by a processor to cause the processor to:

extract, by the processor, one or more blueprint-level aspects from a blueprint formatted with information for one or more computing resources of a cloud-based computing platform;

determine, by the processor, a set of resource definitions for the cloud-based computing platform based on the one or more blueprint-level aspects;

generate, by the processor, a modified blueprint for the cloud-based computing based on the set of resource definitions;

monitor, by the processor, the cloud-based computing platform based on the modified blueprint to learn one or more features associated with the cloud-based computing platform;

utilize, by the processor, inference based schemes to learn one or more features related to one or more computing resources, wherein automated aspects of the learning component are enhanced; and alter, by the processor, a first resource within the blueprint to a second resource distinct from the first resource and wherein the altering the first resource is based on an estimated risk level associated with the first resource, wherein the estimated risk level is a multidimensional vector and includes a confidence value.

18. The computer program product of claim 17, wherein the program instructions are further executable by the processor to cause the processor to:

modify, by the processor, one or more portions of the blueprint based on the set of resource definitions.

19. A system, comprising:
a memory that stores computer executable components; and
a processor that executes computer executable components stored in the memory, wherein the computer executable components comprise:
a computing resource component that modifies one or more first computing resources for a cloud-based computing platform to generate one or more second computing resources for the cloud-based computing platform;
a blueprint component that determines one or more blueprint-level aspects for a blueprint associated with the cloud-based computing platform, wherein the one or more blueprint-level aspects are indicative of encoded information for one or more features associated with the one or more second computing resources for the cloud-based computing platform;
a hybrid cloud composition component that determines a set of resource definitions for the cloud-based computing platform based on the one or more blueprint-level aspects;
a learning component that monitors the cloud-based computing platform based on the one or more blueprint-level aspects to learn one or more features associated with the cloud-based computing platform, wherein the learning component alters a first resource within the blueprint to a second resource distinct from the first resource and wherein the altering the first resource is based on an estimated risk level associated with the first resource, wherein the estimated risk level is a multidimensional vector and includes a confidence value.

20. The system of claim 19, wherein the computing resource component generates the one or more second computing resources for a hybrid cloud-based computing platform, a public cloud-based computing platform, or a private cloud-based computing platform.

21. A computer-implemented method, comprising:
generating, by a system operatively coupled to a processor, one or more computing resources for a cloud-based computing platform;

identifying, by the system, one or more blueprint-level aspects from a blueprint associated with information for the one or more computing resources;

generating, by the system, a set of resource definitions for the cloud-based computing platform based on the one or more blueprint-level aspects;

modifying, by the system, the blueprint based on the set of resource definitions; and altering, by the system, a first resource within the blueprint to a second resource distinct from the first resource and wherein the altering the first resource is based on an estimated risk level associated with the first resource, wherein the estimated risk level is a multidimensional vector and includes a confidence value.

22. The computer-implemented method of claim 21, wherein the modifying the blueprint comprises modifying a resource definition portion within the blueprint based on the set of resource definitions.

23. The computer-implemented method of claim 21, wherein the modifying the blueprint comprises inserting data associated with the set of resource definitions into the blueprint.

* * * * *